(12) United States Patent
Doyama et al.

(10) Patent No.: US 6,320,772 B1
(45) Date of Patent: Nov. 20, 2001

(54) CONVERTER CIRCUIT HAVING CONTROL MEANS WITH CAPABILITY TO SHORT-CIRCUIT CONVERTER OUTPUT

(75) Inventors: Yoshiaki Doyama, Hirakata; Kaneharu Yoshioka, Katano; Mitsuo Ueda, Kadoma; Masanori Ogawa; Hideo Matsushiro, both of Kusatsu, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/573,824

(22) Filed: May 18, 2000

(30) Foreign Application Priority Data

May 26, 1999 (JP) ............................................... H11-146704

(51) Int. Cl.[7] ..................................................... H02M 5/42
(52) U.S. Cl. .............................................. 363/89; 363/127
(58) Field of Search ................................. 363/84, 85, 88, 363/89, 125, 127

(56) References Cited

U.S. PATENT DOCUMENTS

| | | |
|---|---|---|
| 4,855,652 | 8/1989 | Yamashita et al. . |
| 4,891,744 * | 1/1990 | Yamamoto et al. .................... 363/89 |
| 5,751,567 * | 5/1998 | Toyozaki et al. ....................... 363/89 |
| 5,793,624 * | 8/1998 | Couture et al. ......................... 363/89 |

FOREIGN PATENT DOCUMENTS 63-224698     9/1988   (JP) .

* cited by examiner

Primary Examiner—Peter S. Wong
Assistant Examiner—Gary L. Laxton
(74) Attorney, Agent, or Firm—Smith, Gambrell & Russell, LLP

(57) ABSTRACT

A converter circuit has a reactor connectable to an AC power supply. It further has a PWM converter circuit connected to the reactor, the PWM converter circuit including a high speed diode, a rectifier diode and a switching element connected in parallel to the rectifier diode. The converter circuit further has an input current detector for detecting an input current of the PWM converter circuit, a DC voltage level detector for detecting an output voltage of the PWM converter circuit, a voltage polarity detector connected to the AC power supply, and a control device. The control device measures a variation period of the output voltage measured by the voltage level detector to judge a power supply frequency. It then controls the PWM converter circuit based on a power supply frequency judgement result, a detection result from the voltage level detector, an input current detected by the input current detector, and an output voltage detected by the DC voltage detector.

18 Claims, 20 Drawing Sheets

CONVERTER CIRCUIT HAVING CONTROL MEANS WITH CAPABILITY TO SHORT-CIRCUIT CONVERTER OUTPUT

FIELD OF THE INVENTION

The present invention relates to a circuit which converts AC power into DC power, in particular, to a converter circuit with a high power factor which exercises control in order to reduce harmonic frequency components included in the input current by utilizing a pulse width modulation technology.

PRIOR ART

Conventionally, a power unit which has a function of controlling harmonic distortion of the power supply in order to improve the power factor comprises a boost converter circuit which exercises control so that the AC input current becomes a sine-wave shape. For example, as described in the Japanese unexamined patent publication S63 (1988)-224698, after rectifying the input voltage the input current is controlled by the boost converter circuit since a circuit configuration is simple, particularly, in a single phase input power supply. This prior art has a configuration as shown in FIG. 19. That is to say, after rectifying the AC power supply 1 one time with the rectifier diode circuits 102a, 102b, 102c and 102d, a DC power supply is created by the boost converter circuit configured of a reactor 106, a switching element 103, a diode 104 and a smoothing capacitor 7 to be supplied to a load 8.

FIG. 21 is a control block diagram of the control circuit 110 for controlling circuits in FIG. 19. In FIG. 21, an error Verr is gained between set DC voltage Vdc* in the comparison means 37 and actual DC voltage Vdc gained from the resistances 9a and 9b in FIG. 19, which passes through the compensating filter 32 so that the rectified output |Vac| gained by the resistances 111a and 111b in FIG. 19 is inputted to the multiplier 31 to gain set current information |Iac*|. This |Iac*| is compared with actual input current information |Iac| detected as the voltage between both ends of the resistance 113 in FIG. 19 by the comparison means 38, of which the error information |Iac err| is gained to be sent to the compensating filter 133. In the compensating filter 133 a filter operation is carried out to stabilize the input current wave form control. The output of the compensating filter 133 is sent to the comparator to be compared with the output signal from the oscillator 35 which is converted into a pulse width modulation signal PWMout. The pulse width modulation signal PWMout passes through the gate driving circuit 105 to drive and control the switching element 103 in FIG. 19.

FIG. 20 shows a circuit where the number of rectifier diodes as power transferring elements, which is five in the circuit of FIG. 19, have been reduced to four by using a boost-type PWM converter. The AC power supply 1 passes through the reactor 106 to be inputted into a rectifier bridge circuit of which the lower arm is configured of the switching elements 3a, 3b and the rectifier diodes 2a, 2b and of which the upper arm is configured of the high speed diodes 4a and 4b. To the output of the rectifier bridge circuit, in the same way as the case of FIG. 19, a smoothing capacitor 7, a load 8 and resistances 9a and 9b for detecting the output voltage are connected. In addition, a current sensor 213 is provided in order to detect the input current wave form and a transformer 211 is provided in order to detect the input voltage wave form. In order to gain input current wave form information |Iac| in the same way as the case of FIG. 19, diode bridge circuits 251a, 251b, 251c and 251d, are provided of which the result is sent to the control circuit 110. Similarly in order to gain input voltage wave form information |Vac| in the same way as in the case of FIG. 19, diode bridge circuits 212a, 212b, 212c and 212d are provided of which the result is sent to the control circuit 110. The processing configuration of the control circuit 110 is the same as that of FIG. 21.

PROBLEMS TO BE SOLVED BY THE INVENTION

In the former as described in the prior art, however, the output of the AC power supply is rectified one time by a rectifier diode circuit and after that the boost converter circuit is operated, therefore, there is the problem that the number of elements through which the main circuit current passes is large in the circuit which causes a large basic loss.

In the latter as described in the prior art, though the number of elements through which the main circuit current passes is smaller, the detection of the input voltage wave form of the detection of the input current wave form are complicated and large-scaled. Because of this complication of the detection the consumption power for the detection cannot be so small as not to be taken into account. Also, there are many problems such that the large number of switching elements makes it easy to increase noise.

In either case, with respect to the main circuit configuration, no methods for easily gaining a high power factor, for maintaining the high efficiency, which are common basic problems to be solved, or for safe operation at the time of power variation are disclosed.

Considering such problems of conventional converter circuits, it is the purpose of the present invention to provide a converter circuit which can reduce the number of elements through which the main circuit current passes in the circuit with small losses in the main circuit, furthermore so as to additionally reduce the sensing circuit loss and to aim at an increase in effectiveness and which can implement miniaturization, loss reduction or noise reduction to gain a high power factor with a simple configuration.

MEANS FOR SOLVING PROBLEMS

A simple phase PWM converter circuit is configured so that two types of diodes of rectifier diodes for a low forward voltage drop and high speed diodes having a fast recovery function as well as switching elements are used to control the pulse width modulation, according to claims 1 to 8, 19 and 20 of the present invention, which correspond to each aspect of the invention in the following:

(1) In order to miniaturize the detection circuit, which should correspond to a plurality of power supply frequencies, the input AC voltage is, for example, short circuited to the primary side of one photocoupler with resistance elements and the voltage of the secondary side of the photocoupler is inputted to the control circuit in the configuration so that frequency Fac or period Tac of the input AC voltage is calculated out from the reverse period of the voltage of the secondary side of the photocoupler in order to determine the input frequency.

(2) In order to reduce the loss from the detection circuit, the times of (2·Ton+2·Toff+Tac)/4 and (2·Ton+2·Toff+3·Tac)/4 are set at the zero cross time of the AC input voltage using the period Tac calculated out of the on time Ton and off time Toff of the secondary side of the photocoupler.

(3) In order to operate stably against the variation of the power supply, the period calculated out of the on time and the off time of the secondary side of the photocoupler is used to predict the next on time and off time so as to finally modify the prediction time of the subsequent on time and off time based on the polarity of the difference between the next on time and off time which are actually detected.

(4) To simplify the configuration of the control circuit., time measurement through the calculation of the respective times is carried out with a period which becomes the pulse width modulation control period.

(5) To implement the high power factor, the control means inputs output information of the secondary side of the photocoupler for each period so as to confirm the on condition or the off condition continuously for n times and, after that, the peak time and the zero cross time are calculated out as described above among which the time required for "n−1" input processing proceeds to the front to calculate out the above described time.

(6) (19) (20) To reduce main circuit loss the control means generates a sine-wave which crosses at the zero point at the zero cross time for each time measurement so as to control the pulse width modulation of the input current so as to be the same shape as the generated sine-wave, and the set value of the DC output voltage is adjusted so that the minimum value of the duty of the pulse width modulation control becomes substantially a constant value in the vicinity of the peak of the generated sine-wave.

(7) To reduce noise, a pair of reactors sharing one core are connected to the inputs of two terminals of a single phase PWM converter, of which each input passes through each of the reactors.

(8) To reduce the loss of the detection circuit, a current transformer is configured with a power supply input lead of the primary side for the AC power supply input lead, and the output on the secondary side of the current transformer is inputted to the control circuit so that the control circuit operates to compensate the frequency characteristics of the output on the secondary side of the current transformer.

The configuration is provided which has a main circuit comprising reactors, switching elements and high speed diodes and which controls the pulse width modulation to improve the power factor of the single phase AC input power supply current and which also controls the output DC voltage, according to claims 9 to 13 of the present invention, which correspond to each aspect of the invention in the following:

(9) An integration operational function of the error and a proportion operational function of the error are provided in parallel for the error between the output DC voltage and its set value so as to determine the input current command with the sum of outputs from the two operational functions in the configuration and the integration operational function fixes the output of the integration operational function to the value present value in the case when the error becomes more than a certain value.

(10) In the case that a current command operational value based on the voltage error information exceeds a predetermined value, it is controlled with the predetermined value.

(11) In the case that the output voltage is higher than by a predetermined width or more for the set value of the output voltage, the switching element is forced to be turned off.

(12) The control operation for stabilization control based on the current error information has characteristics which have a PI type having integral characteristics in the low frequency range and which have flat or moving averaging characteristics in the high frequency range.

(13) Pulse width modulation command information is gained by adding the value dff according to the following operational equation to the pulse width modulation command information gained by carrying out the compensating operation for stable control based on the current error information between the actual AC current and command current, reactor value L, target current value I*, input voltage value Vac and output DC voltage set value Vdc; dff=(Vdc*−|Vac|)/Vdc*+L·(|Iac|*−|Iac|* old)/Vdc* wherein "|Iac|* old" is a current command value one unit of measurement previous in time.

DESCRIPTION OF THE NUMERALS

Figure 1A:
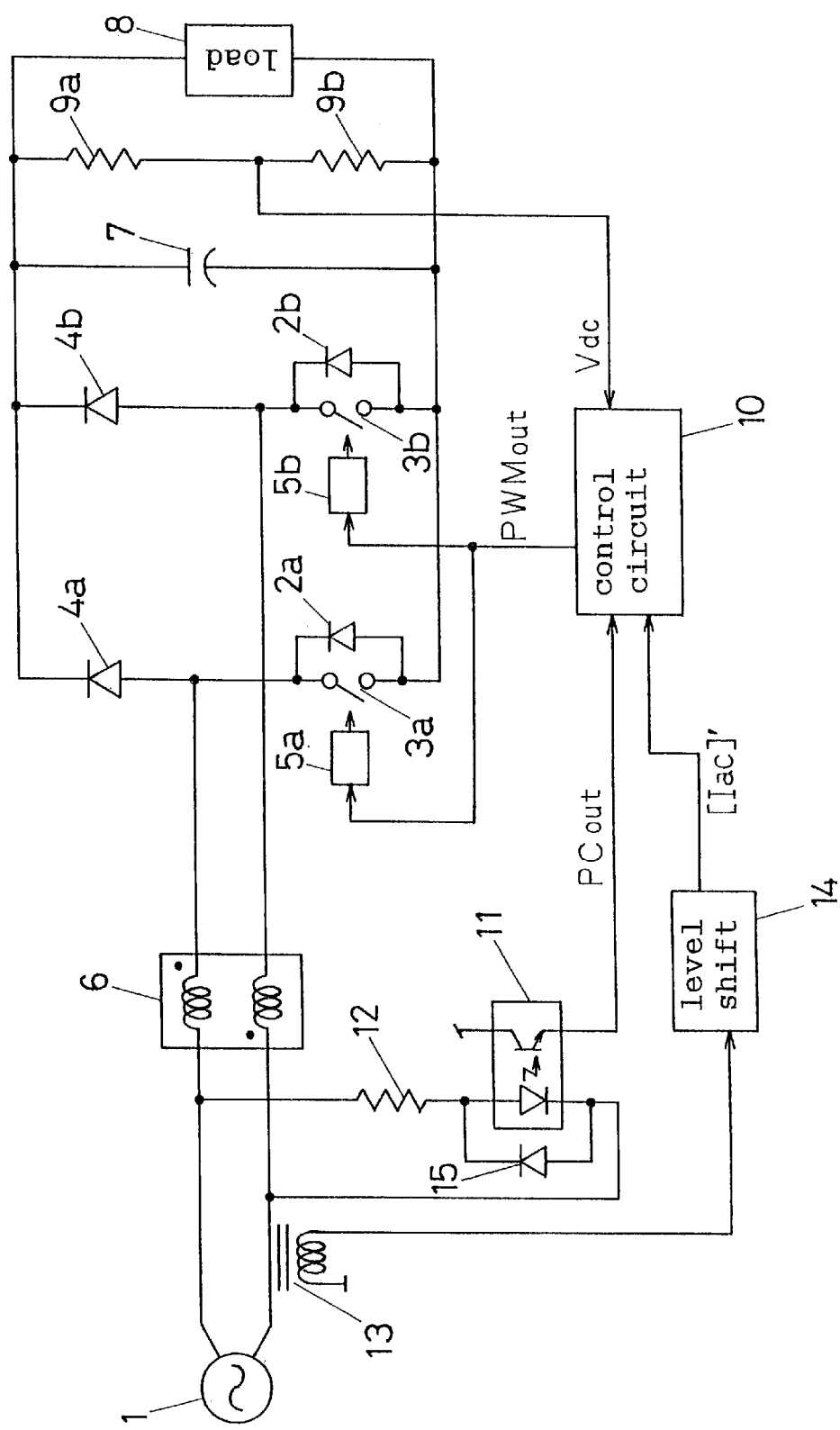
FIGS. 1(a) and 1(b) are configuration diagrams showing a converter circuit of the first embodiment according to the present invention.

1 AC power supply
2a, 2b rectifier diodes
3a, 3b switching elements
4a, 4b high speed diodes
6 reactor
10 control circuit
11 photocoupler
13 current transformer
36 sine-wave generation means
40 wave form equalization means
41 judgment means
1140 feed forward operation part
1141 judgment part
1145 limitation means
1301 integrator
1302 moving averaging means

DETAILED DESCRIPTION OF THE INVENTION

The present invention is described based on the drawings showing the embodiments in the following.
(First Embodiment)

Figure 1:
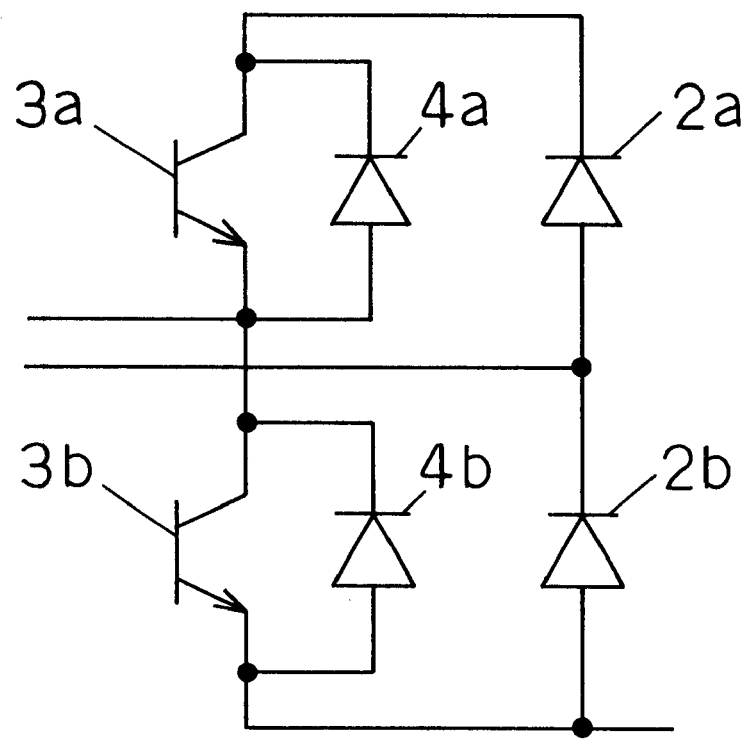

FIG. 1 is a configuration diagram showing a converter circuit of the first embodiment according to the present invention. In FIG. 1, the output of the AC power supply 1 passes through the coke 6 to be inputted to a bridge circuit of which the lower arm is configured of rectifier diodes 2a, 2b and the switching elements 3a, 3b and of which the upper arm is configured of the high speed diodes 4a, 4b. To the output of the bridge circuit an output voltage detection circuit comprising smoothing capacitor 7, the load 8 and resistances 9a, 9b is connected. And to the AC power supply 1, a voltage polarity detection circuit comprising a current transformer 13, resistance 12 and a photocoupler 11 is connected. The diode 15 connected in parallel to the primary of the photocoupler 11 is for protecting the photocoupler 11. The current transformer 13 inputs the detection information to the current circuit 10, through the level shift means 14, and the voltage polarity detection circuit inputs, from the secondary side of the photocoupler 11, respectively. The control circuit 10 calculates a proper pulse width modulation output PWMout of the switching elements 3a and 3b based on the input current information [Iac]', the voltage polarity information PCout and the DC voltage Vdc to be outputted to the driving control circuit 5a and 5b of the respective switching elements.

Here, the bridge part of the converter circuit is not limited to the one shown in FIG. 1(a) and may be a PWM converter circuit configured of an arm comprising two pairs of parallel circuits of high speed diodes 4a, 4b and switching elements 3a, 3b connected to said reactor 6 as well as an arm comprising two pairs of rectifier diodes 2a and 2b connected to the other terminal of said AC power supply 1 as shown in Fig 1(b).

Figure 2:
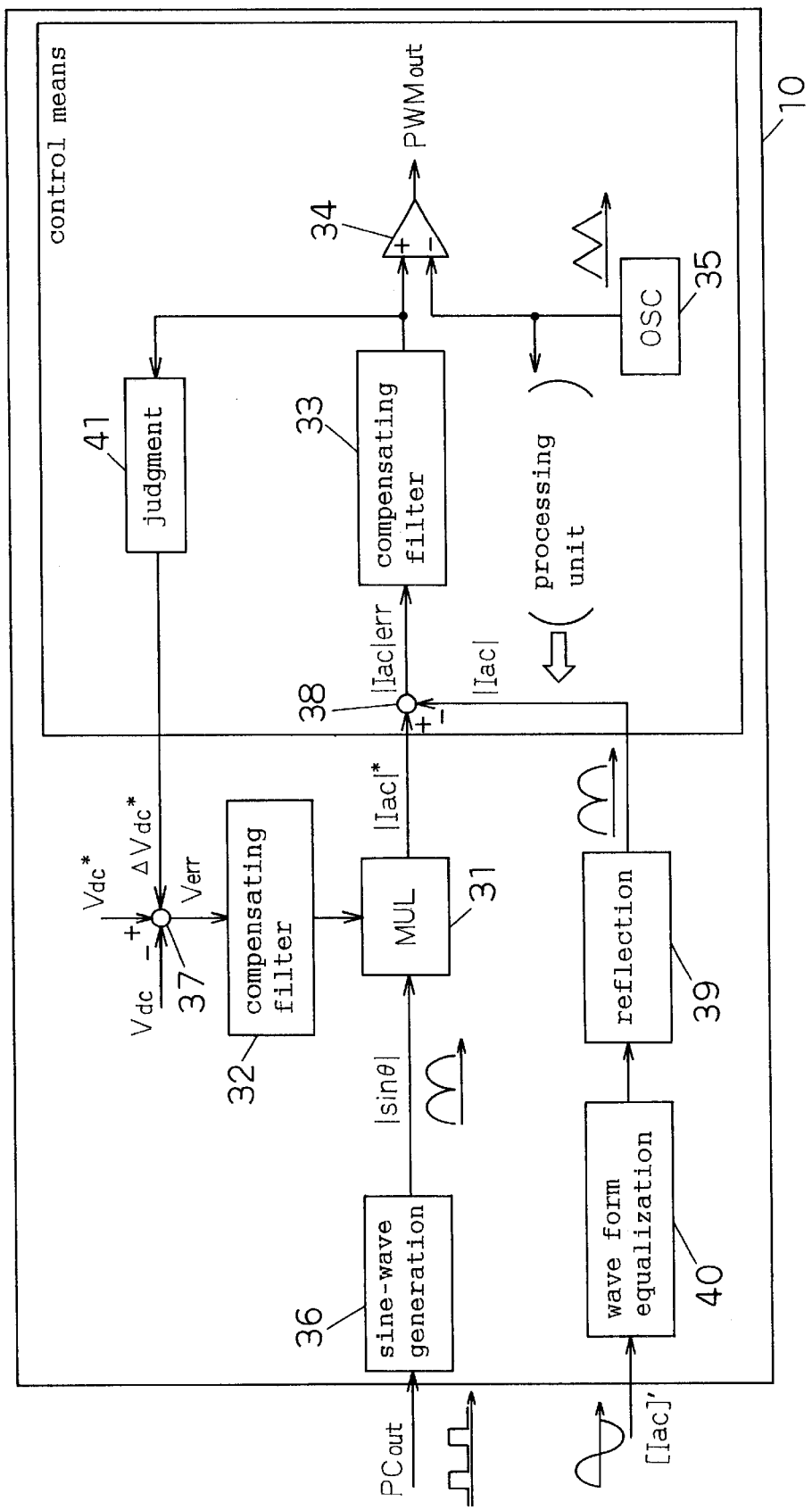
FIG. 2 is a processing block diagram of the control circuit according to the first embodiment.

Next, the summary of the control circuit 10 is described using FIG. 2. The output PCout of the photocoupler 11 is inputted to the sine-wave generation means 36 in FIG. 1 to reproduce the absolute value of the sine-wave, which is inputted to the multiplier 31. The operation of the sine-wave generation means 36 is described in the following. On the other hand, in the adder-subtractor 37, the voltage error signal Verr gained by adding the DC voltage setting adjustment value Δ Vdc* to the difference between the set value Vdc* of the DC voltage output and the actual DC voltage Vdc is inputted to the compensating filter 32. In the compensating filter 32 a compensating operation is carried out for stably operating the DC voltage control system. The content of the compensating operation is described in the following. The result of the compensating filter 32 is sent to the multiplier 31 to be multiplied with the sine-wave absolute value. The multiplication result becomes an input current command value |Iac|*, which is compared with the input current equivalent value |Iac| at the adder-subtractor 38 to gain the input current error information |Iac| err.

The input current equivalent value |Iac| is gained through the current detection means 13 and the level shift circuit 14 via the wave form equivalent circuit 40 and reflection means 39.

The process up to the point when the input current equivalent value is gained is described in the following. The input current error information |Iac| err is sent to the compensating filter 33, which carries out a compensating operation for stably operating the input current control system. The result of the compensating filter 33 is sent to the comparator 34 to be compared with the output of the oscillator 35 to gain the pulse width modulation signal PWMout. The pulse width modulation signal PWMout is sent to the driving control circuits 5a and 5b of the switching elements in FIG. 1 in order to drive the switching elements 3a and 3b. The output of the compensating filter 33 is sent to the judgment means 41. The result of the judgment means 41 is inputted to the adder-subtractor 37 as the DC voltage setting adjustment value Δ Vdc*. The content of the judgment means 41 is described in the following.

All of these operations are carried out by synchronizing to the output of the oscillator 35 so as to have an easy timing management. The frequency of the oscillator 35 becomes a switching frequency by the switching elements 3a and 3b, therefore, the frequency value of approximately 20 kHz or more is adopted so that the electromagnetic noise by current ripples at reactor 6 cannot be detected.

Figure 3:
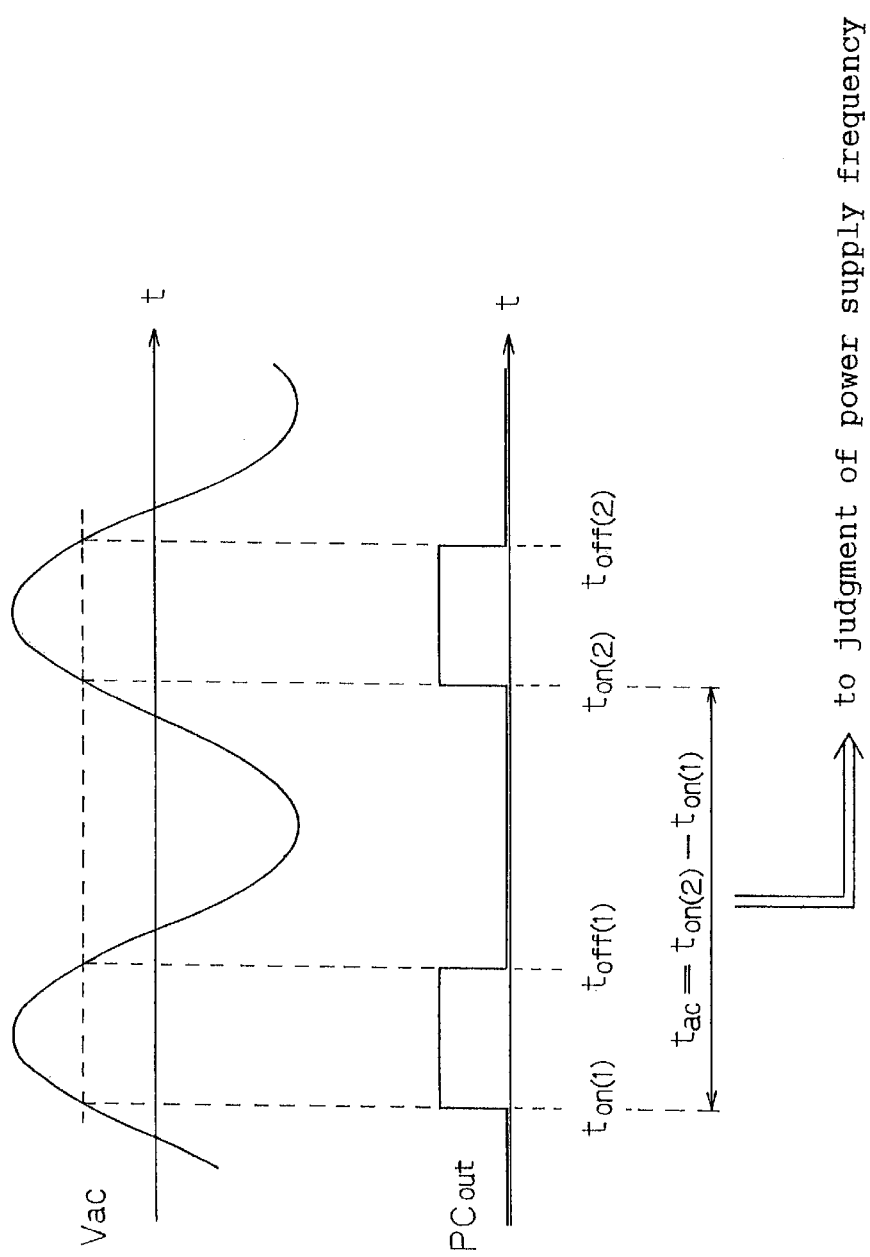
FIG. 3 is a wave form diagram showing the operation of the sine-wave generation means in the above FIG. 2.

FIGS. 3, 4, 5 and 6 are a wave form diagram showing the operation of the sine-wave generation means 36 of FIG. 2. The wave form diagram of FIG. 3 shows a relationship between the input power supply voltage Vac and the photocoupler output PCout. In the case when the input power supply voltage exceeds a predetermined value the photocoupler 11 is turned on so that the PCout converts to a high level. As is clear in FIG. 3, the term of being high level and the term of being low level are not necessarily the same. In order to equalize the term of being high level and the term of being low level it is necessary to increase the current on the primary side of the photocoupler 11 by reducing the resistance 12. This, however, increases the power consumption in practice, which conflicts with the purpose of reducing the loss from the main circuit. The photocoupler output where the term of being high level and the term of being low level don't coincide is inputted to the control circuit 10, where the rise time of the PCout signal ton (1) , ton (2) . . . etc. and fall time toff (1), toff (2) . . . etc. are measured. In the control circuit, intervals between the rise time are found, for example, which form the period tac of the input power supply. That is to say, the frequency of the input power supply can be seen. Since the power supply frequency is generally 50 Hz or 60 Hz, the period becomes 20 ms or 16.7 ms which are approximately 400 counts or approximately 333 counts according to the period 50 µs of the switching frequency, it becomes easy to discriminate even under the influence of the measurement error or the like.

The power supply frequency value gained in this way calculates out how far the power supply phase is advanced for every switching period. That is to say, in the case of 50 Hz, 360/400 degrees for every switching period may be advanced and in the case of 60 Hz, 360/333 degrees may be advanced. In addition, it can be used to avoid an interference point between the motor revolution number and the power supply frequency, for example, when a load, such as one having a pulse torque, is driven by a motor.

Figure 4:
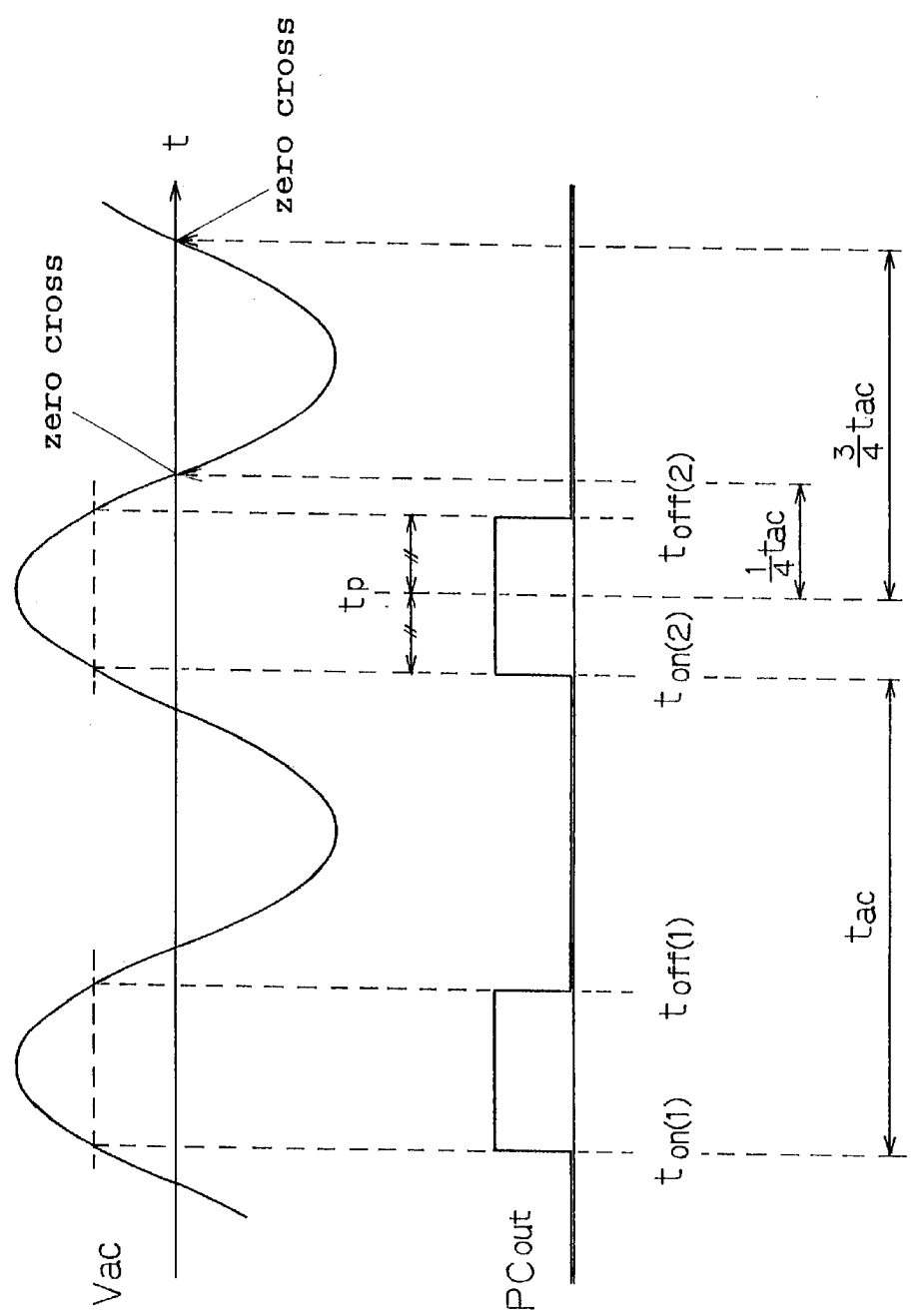
FIG. 4 is a wave form diagram showing the operation of the sine-wave generation means in the above FIG. 2.

FIG. 4 shows a method for calculating out the zero cross time of the power supply voltage from the same wave form diagram as that of FIG. 3. As is clear from FIG. 4, the middle time tp between rise time ton (1) of the PCout and the fall time toff (1) becomes the peak time of the power supply voltage. Accordingly, the time delayed by 90 degrees (tac/4) from the peak time tp is the zero cross time of the fall and the time delayed by 270 degrees (3·tac/4) from the peak time tp is the zero cross time of the rise. By using those zero cross times the timing according to which the zero is read out from the sine-wave table is determined.

Figure 5:
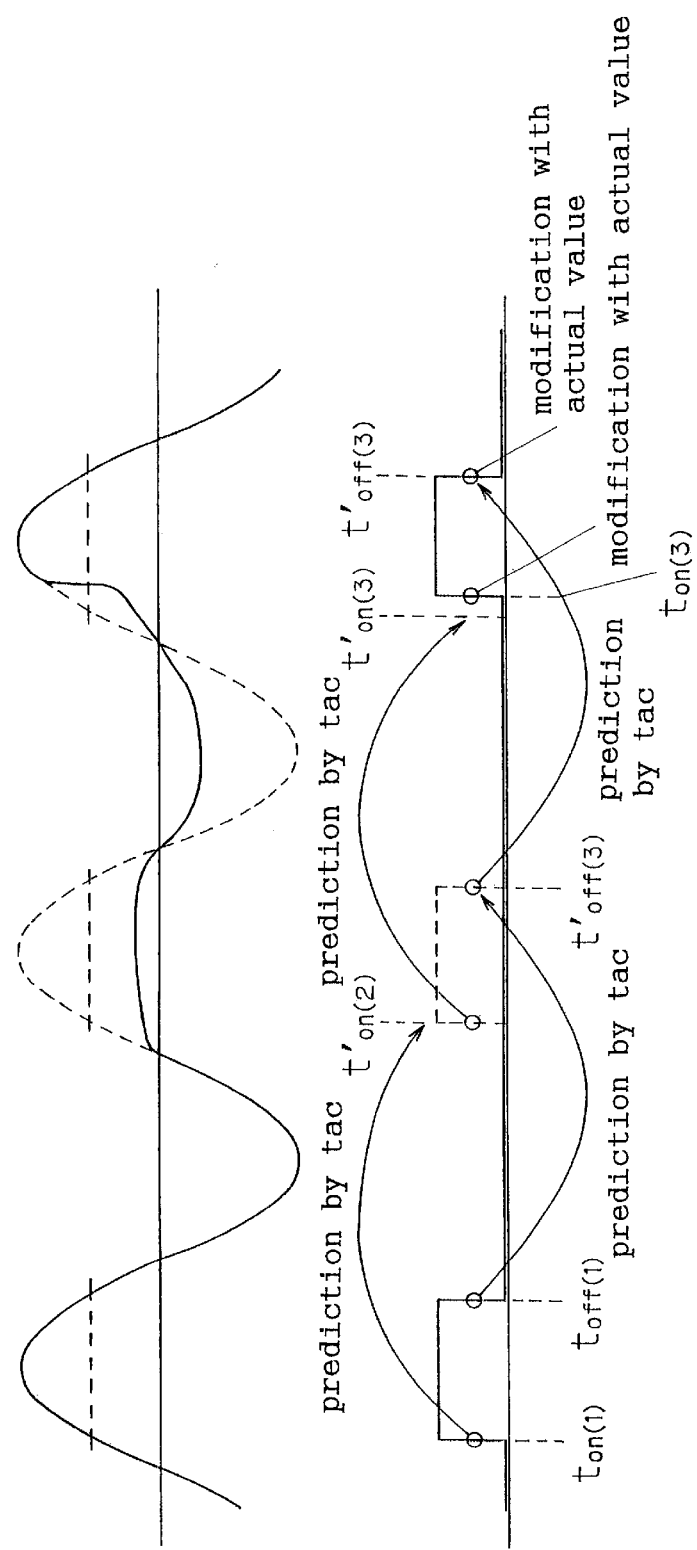
FIG. 5 is a wave form diagram showing the operation of the sine-wave generation means in the above FIG. 2.

FIG. 5 is a timing wave form diagram showing a processing method for stable operation showing that even when the input power supply condition is not stable instant power failure or the like occurs. It is assumed that the power supply was normal until ton (1) and toff (1). Based on this time and the power supply period tac, the variation time t'on (2) and t'off (2) of the next PCout are predicted. As shown in FIG. 5, in the case when the PCout doesn't vary, the prediction value is adopted as it is. In addition, the subsequent variation time t'on (3) and t'off (3) are predicted. In the case that the variation of the PCout cannot be detected the same processing is carried out. In the case that the variation of the PCout is detected modification processing takes place using the actual values ton (3) and toff (3). The reason why the modification process takes place is that the case where the variation timing is not normal can be considered as ton (3) in FIG. 5. For the modification process the value gained by delaying the prediction value t'on (3) by one unit of measurement is used in the case when the actual value ton (3) is delayed from the prediction value t'on (3). By doing this, for only one time of slippage, almost no influence is undergone. It also can catch up in the case when the phase of the input power supply fluctuates under some influence.

Figure 6:
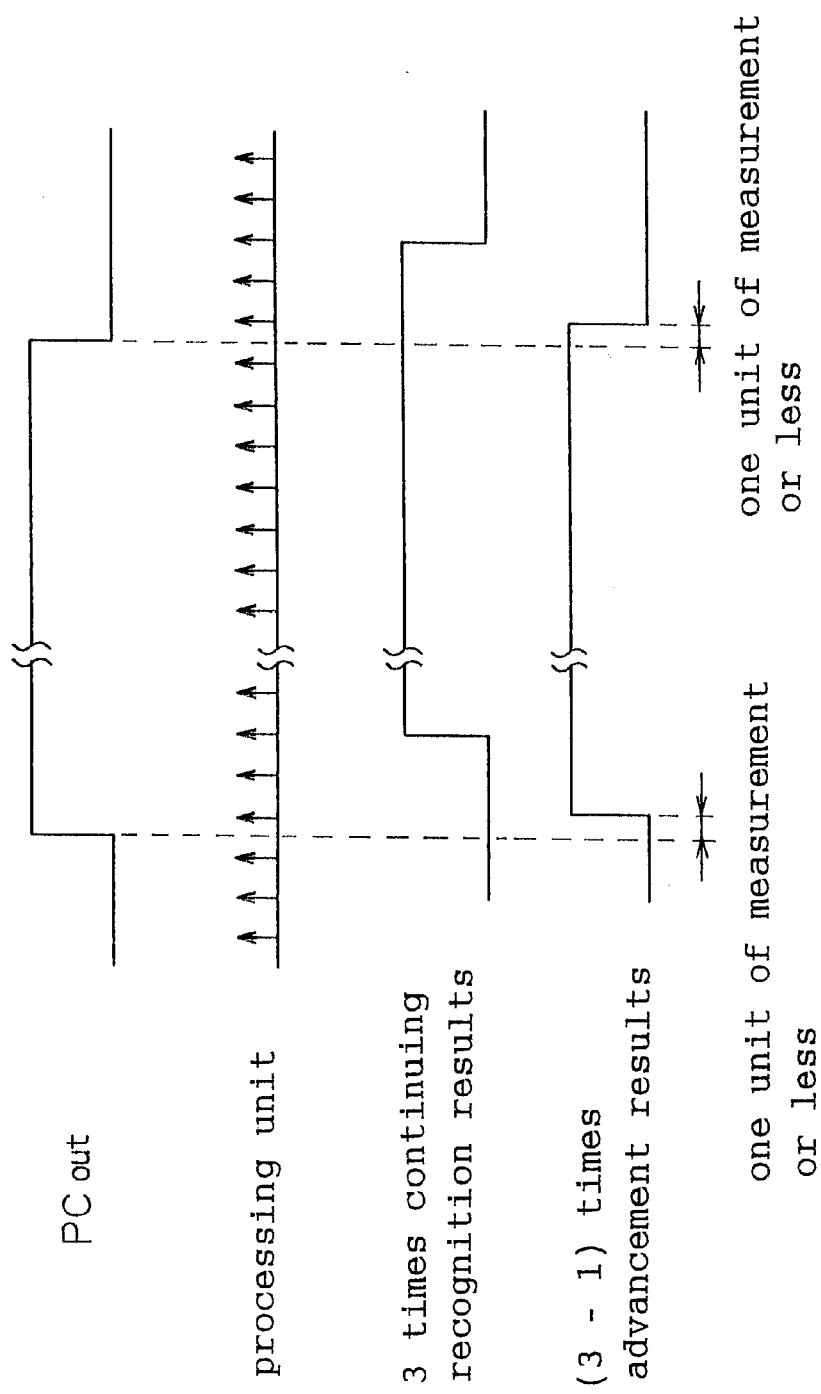
FIG. 6 is a wave form diagram showing the operation of the sine-wave generation means in the above FIG. 2.

FIG. 6 is a diagram showing a processing method in the case that the control circuit 10 is prevented from undergoing any influence, such as noise, when reading in the PCout output. In general, the control circuit 10 is implemented with a microcomputer or the like which commits no malfunction due to noise by reading in a plurality of times when reading in through terminals. FIG. 6 shows a recognition result of the case where a confirmation is carried out through three consecutive read-ins. The recognition result exhibits a delayed timing from actual practice due to the confirmation of the consecutive read-ins. When recognition results are advanced by two units, however, it becomes possible to make it the time delayed within one unit of measurement from the actual signal PCout. When putting it in generalized form, "n−1" units of measurement are advanced for the plurality of read-in times "n."

Figure 7:
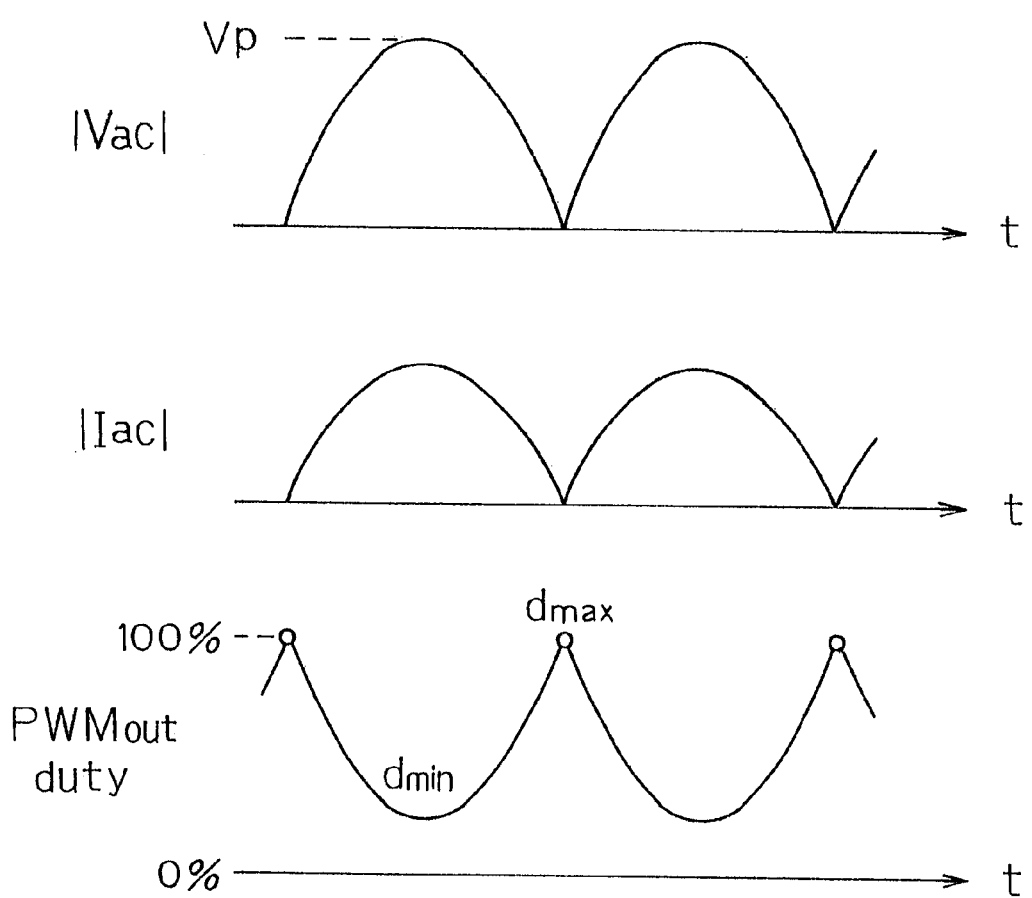
FIG. 7 is awave form diagram showing the operation principle of the DC voltage setting adjustment in the first embodiment.
Figure 8:
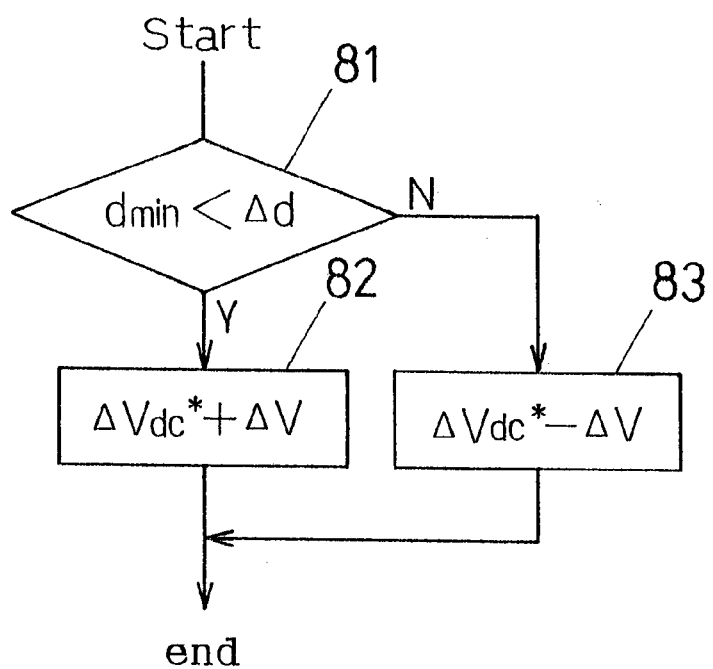
FIG. 8 is a flow chart showing the processing of the DC voltage setting adjustment.

FIGS. 7 and 8 are diagrams showing the process of finding the DC voltage setting adjustment value Δ Vdc* by the judgment means 41 in FIG. 2. FIG. 7 shows a relationship between the voltage wave form |Vac| and the current wave form |Iac| at the time of stable condition and the on-duty of PWMout. The on-duty of PWMout exhibits a value close to 100% in the vicinity where the voltage is zero. In the input voltage peak Vp, the on-duty of PWMout becomes the smallest value dmin. The value of dmin is represented as "(Vdc/Vp)−1" when the influence of the input voltage variation around there is not taken into account. And because of being a booster converter, "Vdc >Vp" is a necessary condition. For example, in the case of being "Vp >Vdc" dmin becomes 0. At this time the converter is in the condition where the input current wave form cannot be controlled. On the other hand, when the PWM is turned on it is the term where current is stored in the reactor 6 by switching elements 3a and 3b, therefore, the longer the term is the greater the loss becomes. Accordingly, it is preferable to lower Vdc as much as possible. The voltage of the input AC power supply receives variation due to the power condition or the like, however, the Vp varies in the same way. Therefore, Vdc is normally set considering the maximum value of Vp. In the case of normal power voltage, however, Vdc is set at a high value which lowers the efficiency. In the entire circuit diagram of FIG. 1, a circuit for detecting the power voltage on the AC side is not included.

The flow chart of FIG. 8 shows an operational procedure of the DC voltage setting adjustment value Δ Vdc* for adjusting the optimum DC voltage set value Vdc* properly. The minimum value dmin of the pulse width modulation duty is assumed to exist inside of the control circuit 10. This processing is carried out approximately one time for one period term of the input power supply. In the judgment 81 it is judged whether or not dmin is smaller than a predetermined value Δ d. In the case of "dmin <Δ d," it proceeds to the process 82 and in the negative case it proceeds to the process 83. In the process 82 the DC voltage setting adjustment value ΔVdc* is increased microscopically and in the process 83 the DC voltage setting adjustment value A Vdc* is decreased microscopically so as to complete one time of adjustment task. By carrying out those processes an adjusted value of Vdc with a practically minimum loss in the circuit can be gained because the process is carried out for increasing Vdc in the case that Vdc is not large enough for Vp with a too small value of the duty minimum value dmin.

Figure 9:
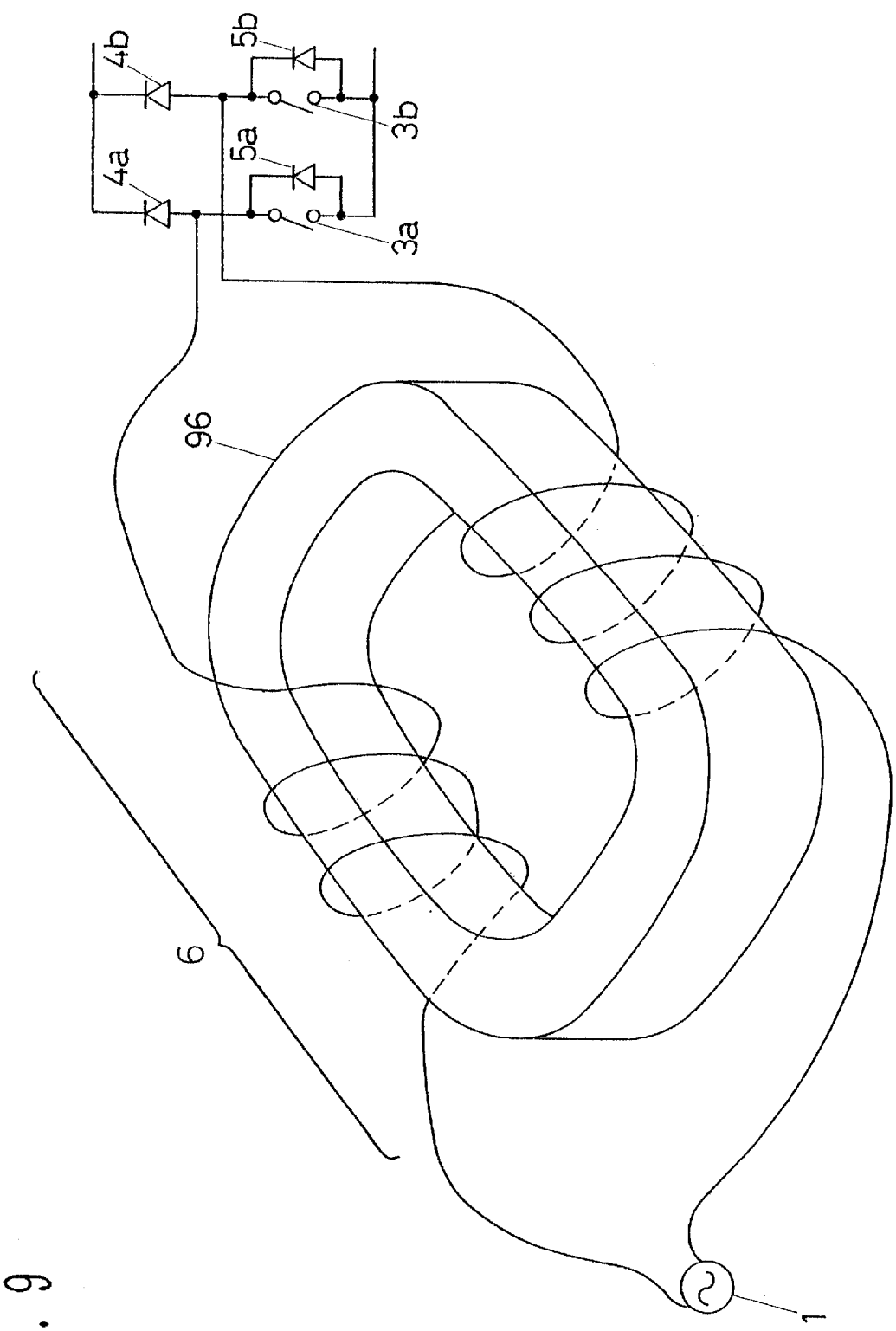
FIG. 9 is a perspective view showing a configuration of the reactor in the first embodiment.

FIG. 9 shows a configuration of reactor 6 in FIG. 1. As is clear in FIG. 9, coils are wound with the same winding number around the common core 96 so that the magnetic fields by currents point in the same direction. Here in FIG. 9 the winding number is depicted as small to make it easy to see the winding direction. By inserting reactors to both sides of the AC power supply input, the voltage variation by the switching of the switching elements 3a and 3b is separated from the AC power supply 1 on both sides so as to enable the reduction of noise.

Figure 10:
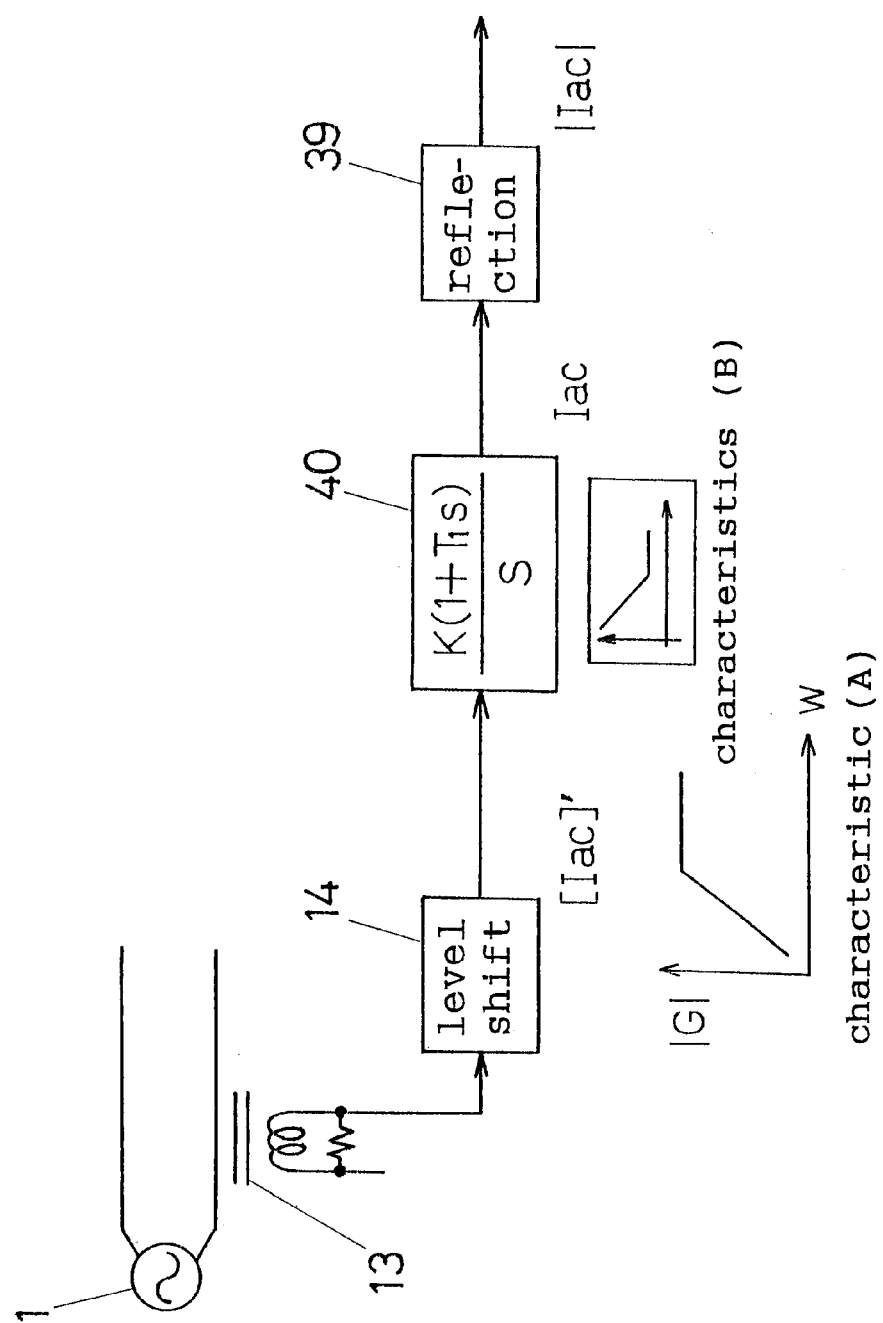
FIG. 10 is a processing block diagram showing the information processing of the current transformer in the first embodiment.

FIG. 10 shows a block diagram of a part with respect to the input processing of the current transformer 13 in FIG. 1 and an associated frequency characteristic diagram. Current is detected from the output of the AC power supply 1 at the current transformer 13. The current transformer 13 is a passive element with the output where zero volt is the center, which is converted into a voltage range that can be processed by the control circuit 10 in the level shift circuit 14. The output of the current transformer 13 has the characteristic that the sensitivity is lowered in the low frequency area as shown in characteristic (A). Therefore, by passing through the wave form equalization circuit 40 having the characteristics (B) a wave form with the same frequency characteristics as the actual current wave form can be gained. In addition, the output of the wave form equalization circuit 40 is inputted to the reflection circuit 39 to be converted to the absolute value of the input current. The wave form equalization circuit 40 and the reflection circuit 39 can be easily implemented by software of the control circuit 10. Thereby, it becomes possible to easily control without much power consumption by the current transformer 13.

(Second Embodiment)

Figure 11:
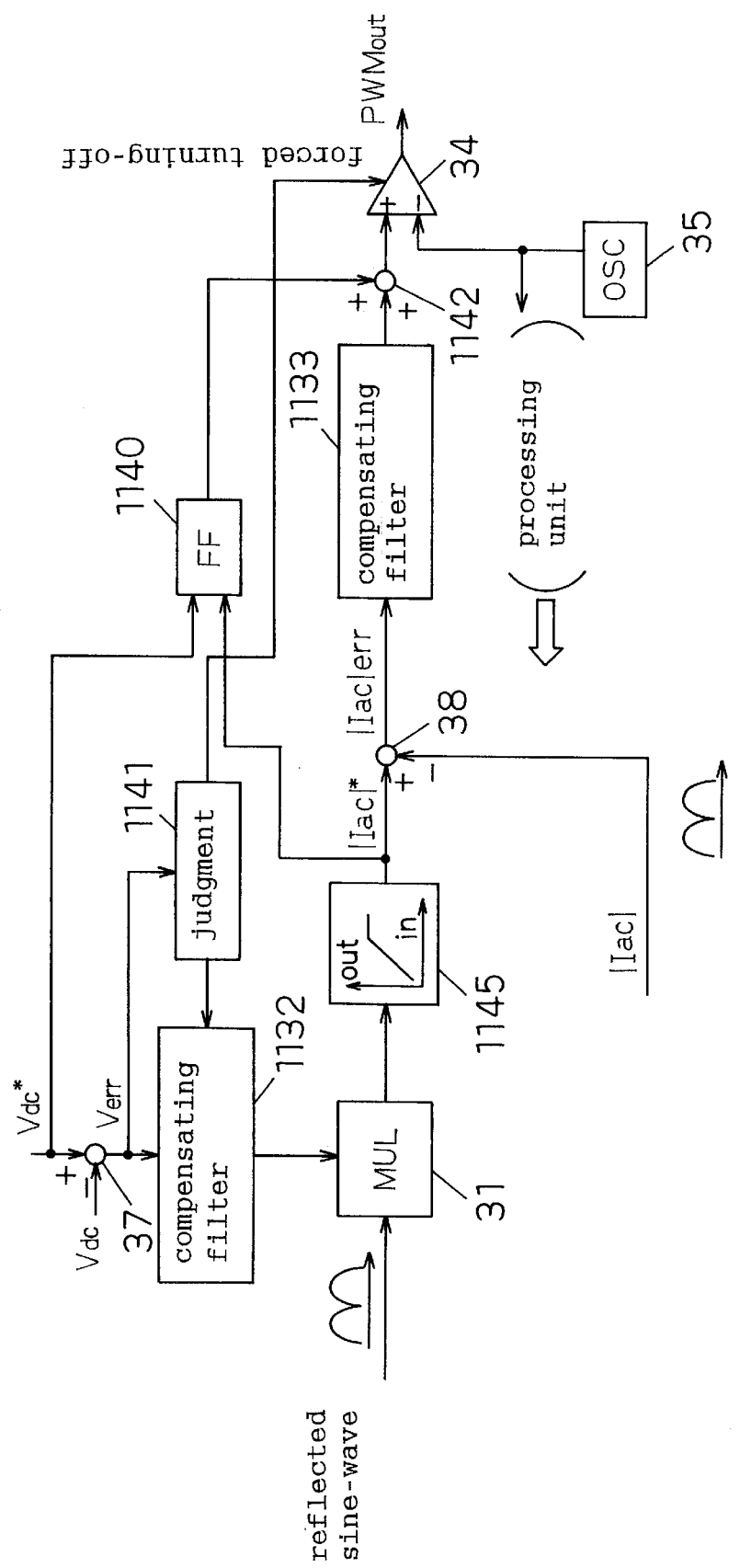
FIG. 11 is a processing block diagram of the control circuit in the second converter circuit according to the present invention.
Figure 19:
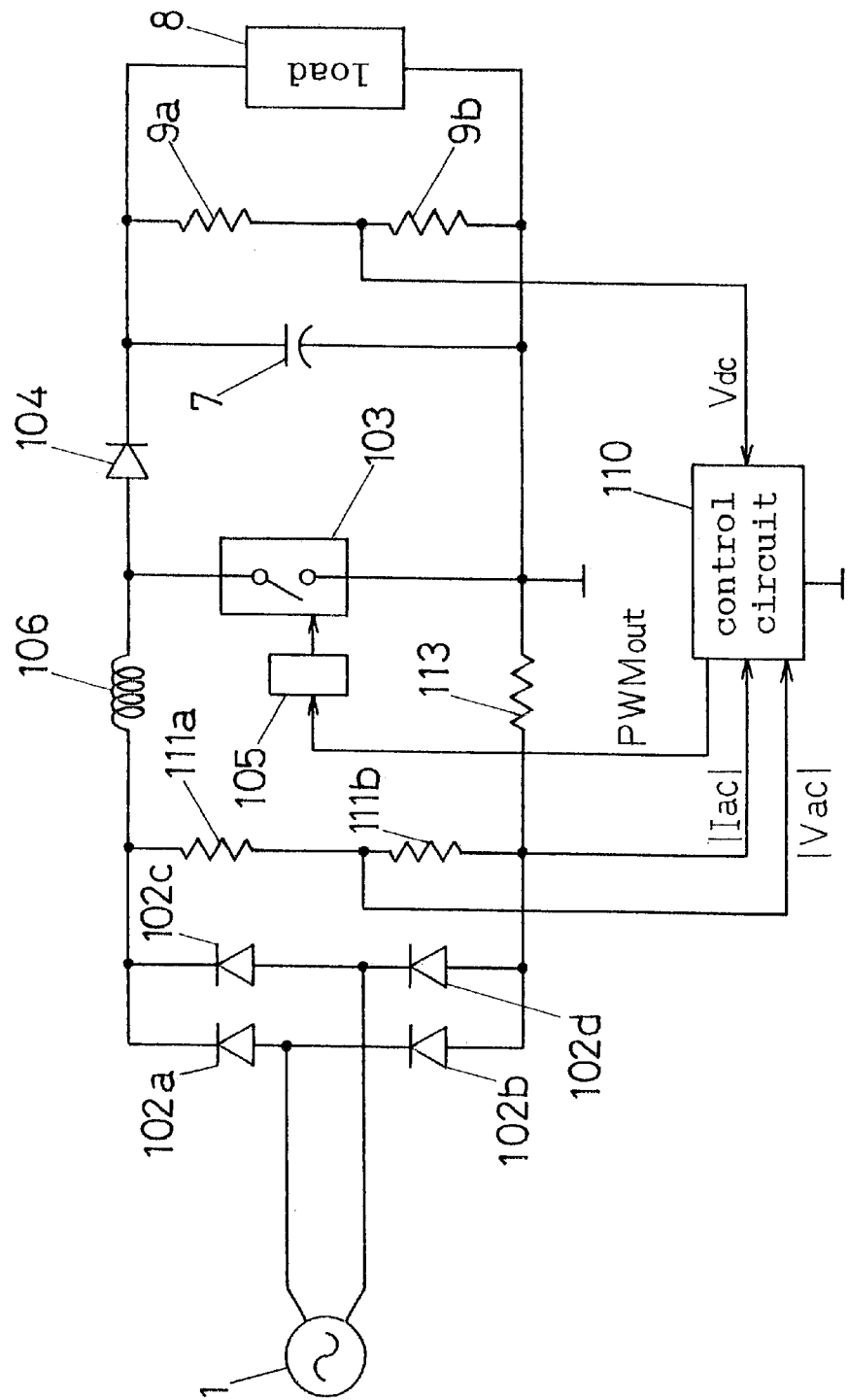
FIG. 19 is a configuration diagram showing a converter circuit according to a prior art.
Figure 20:
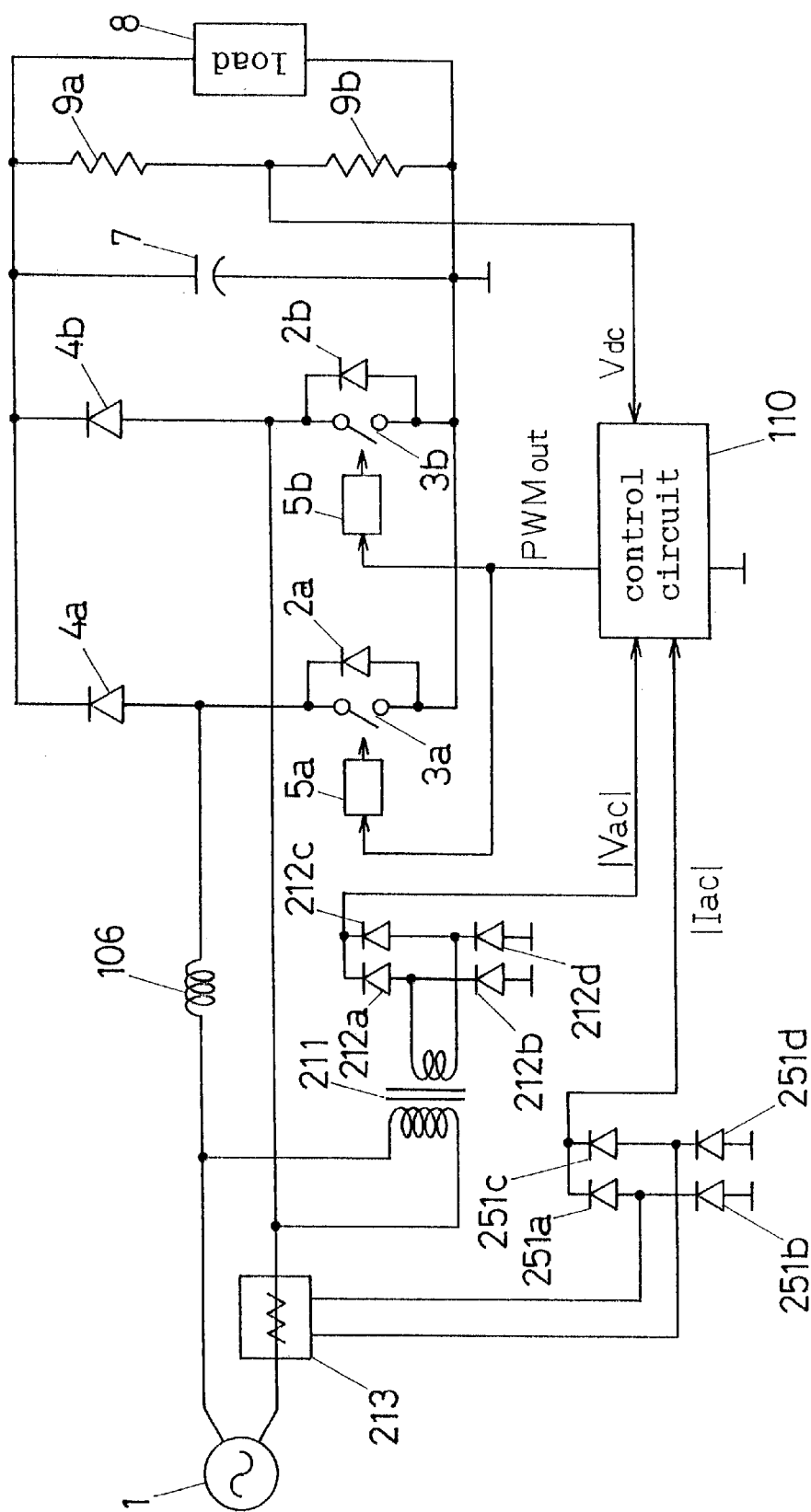
FIG. 20 is a configuration diagram showing a converter circuit with a low loss according to a prior art.
Figure 21:
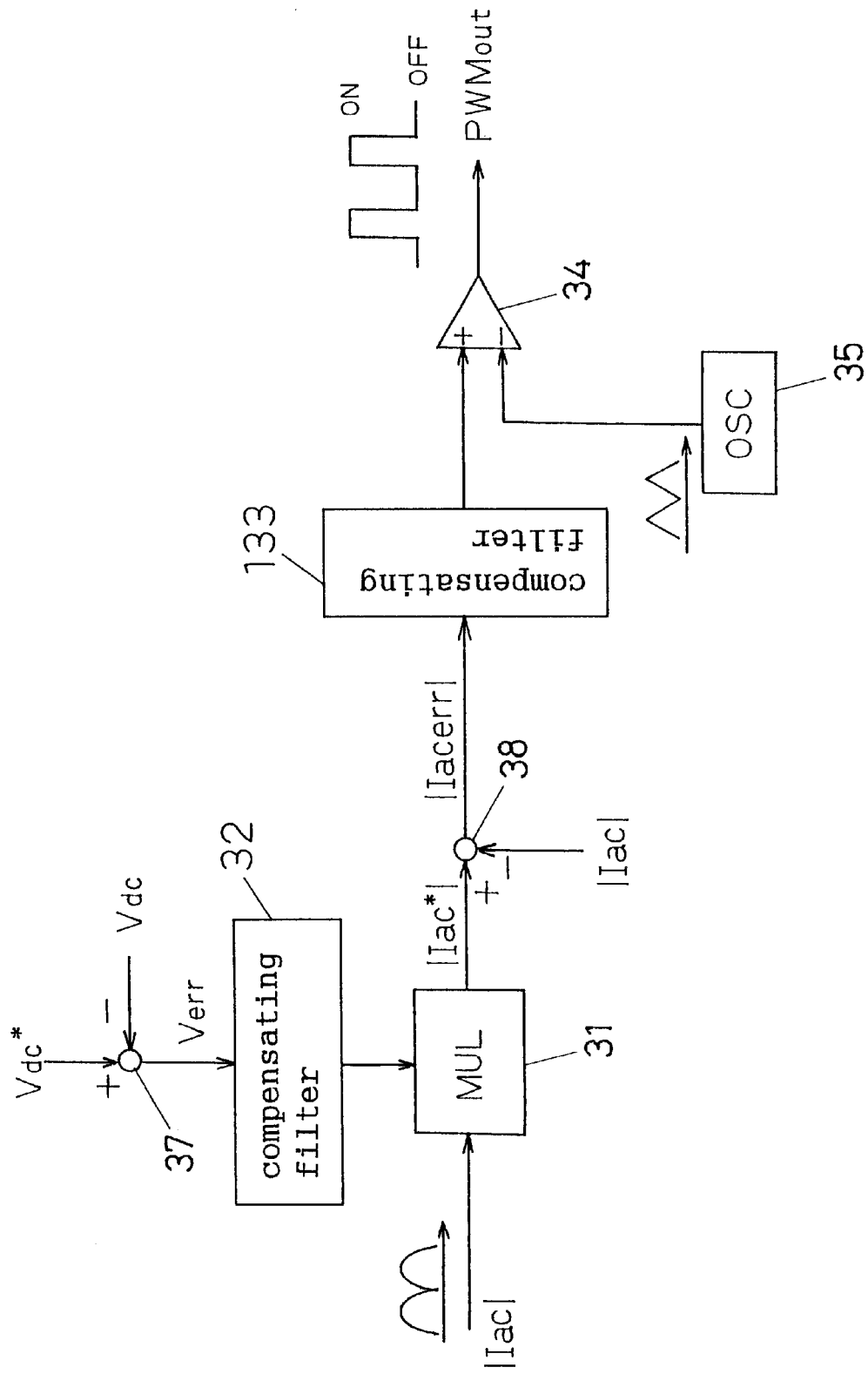
FIG. 21 is a processing diagram of the control circuit according to a prior art.

FIG. 11 is a block circuit diagram showing a control circuit configuration of the second embodiment according to the present invention. It is possible for the main circuit configuration of the second embodiment according to the present invention to be of the same configuration as that of FIG. 1, or configurations of FIG. 19 or FIG. 20 are possibly applicable. In FIG. 11, the DC output voltage value Vdc is compared with the output DC voltage set value Vdc* at the addition and subtraction circuit 37 in order to gain the DC voltage error information Verr. The DC voltage error information Verr is sent to the compensating filter 1132 and the judgment means 1141. The compensating filter 1132 is for stabilizing the operation of the DC voltage control system and the judgment means 1141 is for controlling the operation of the compensating filter 1132 by the DC voltage error information Verr, of which the operation is described in the following. The output of the compensating filter 1132 is sent to the multiplier 31 together with the reflected sine-wave form so as to gain the multiplication result, which is sent to the limitation means 1145 and, after the limitation is added, it is converted to the input current command |Iac|*. The reason why the limitation is added is described in the following. The reflected sine-wave wave form corresponds to the output of the sine-wave generation means 36 in the case of FIGS. 1 and 2, corresponds to the divided voltage result by the resistances 111*a* and 111*b* in the case of FIG. 19 and corresponds to the rectification result of the output from the transformer 211 by the bridge circuits 212*a*, 212*b*, 212*c* and 212*d* in the case of FIG. 20.

The input current command |Iac|* is compared with the reflected wave form |Iac| of the input current to the addition and subtraction circuit 38 at the addition and subtraction circuit 38 so as to gain the input current error information |Iac| err to be sent the compensating filter 1133. The input current command |Iac|* is sent to the feed forward operation means 1140 for operating the feed forward value of the pulse width modulation output value PWMout with the DC output set value Vdc* in order to improve the control characteristics. The content of the feed forward operation means 1140 is described in the following. In the compensating filter 1133, a compensating operation is carried out for stabilizing the operation of the input current control system, of which the result is sent to the addition and subtraction circuit 1142 to be added to the result of the feed forward operation means 1140. The addition result is sent to the comparator 34, which is compared with the output from the oscillator 35 to gain the pulse width modulation output PWMout. The processing, such as compensating filter processing, limitation means, addition and subtraction means and feed forward operation processing, is carried out synchronously with the period of the output signal from the oscillator 35.

Figure 12:
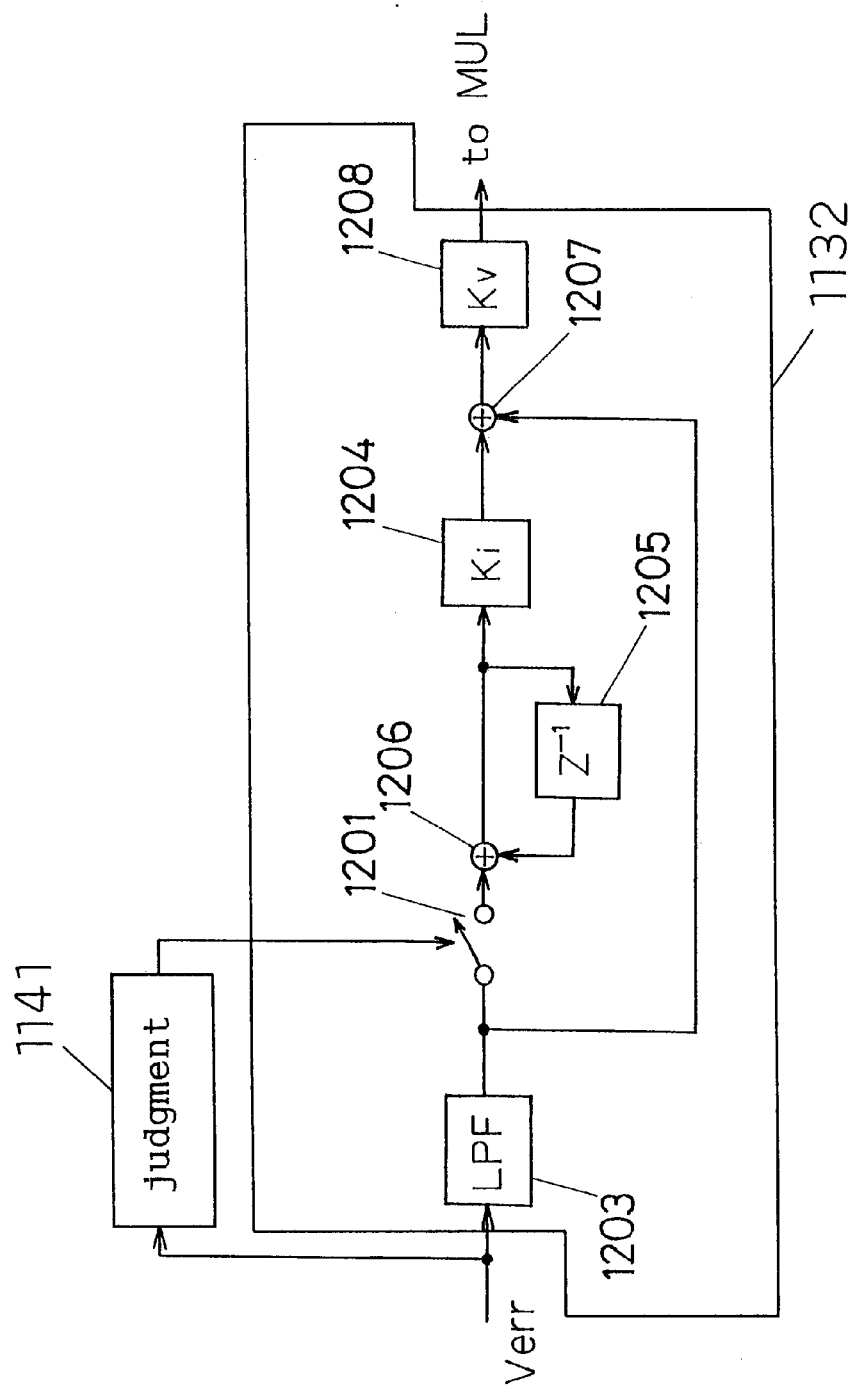
FIG. 12 is a processing block diagram showing compensating filter processing of the voltage control system in the second embodiment.

FIG. 12 is a detailed block diagram of the compensating filter 1132 and the judgment means 1141 of the voltage error information Verr in FIG. 11. The voltage error information Verr is inputted to the judgment means 1141 and a low pass filter 1203. The low pass filter 1203 is for eliminating the power supply frequency components included in the voltage error information Verr. The output of the low pass filter 1203 is sent to the switching means 1201 and an addition means 1207. In the case that the voltage error information Verr is a value greater than a certain value, the judgment means 1141 exercises control so as to shut down the switching means 1201. The output of the switching means 1201 is sent to the addition means 1206. In the addition means 1206, one unit of previous measurement information of the delay means 1205 is consecutively added. That is to say the delay means 1205 and the addition means 1206 configure an integrator. The result of the addition means 1206 passes through the multiplication means 1204 where a constant number is multiplied to be sent to the addition means 1207. In the addition means 1207, the output of the low pass filter 1203, that is to say, information before the integrator and the output information of the integrator are added. That is to say, the process of "proportion"+"integration" is realized. The output of the addition means 1207 passes through the multiplication means 1208 where a constant number is multiplied to be sent to the multiplier 31 in FIG. 11.

The operation principle in FIG. 12 is described. The control system of the DC output voltage can only follow to sufficiently low frequency components of the power supply frequency under the presupposition of maintaining the power factor of the power supply. That is to say the response of the control system cannot be accelerated. On the other hand, to eliminate the constant deviation it is necessary to insert an integrator. To insert an integrator, however, becomes a factor for phase delay which interferes with safety, therefore, the time constant should only be long enough for the time constant of the control system as whole. That is to say, the time constant of the integrator needs to be set at an extremely long value. As a result, in the case that the integration result of the integrator is shifted from the constant condition, such as at the time of start up, an integration type compensating element inserted for reducing the constant deviation may not respond normally in certain cases for the time corresponding to the time constant of the integrator resulting in over current flows or outputs of over voltage causing damage to the circuit. In the configuration of FIG. 12 the input to the integrator is shut down in the case that the voltage error is large such as at the time of start up to maintain the result gained so far (zero in the initial condition). Accordingly, the output of the addition means 1207 is gained from the part which doesn't pass through the integrator so that the influence from the time constant of the integrator can be avoided. Even though a constant deviation occurs in the case when the voltage error information is within a constant range the switching means 1201 closes to operate the integrator so that the operation for eliminating the constant deviation is started.

Next, the operation principle of the limitation means 1145 in FIG. 11 is described. The limitation means 1145 is for safe operation when the power supply voltage varies especially when the power supply voltage is lowered. In the case when the power supply voltage is lowered the DC output voltage is also lowered in the case of being under the same current command. As a result a feed back control is exercised so that the current command becomes a larger value. At that time when the power supply voltage is lowered, however, a command of an extreme over current is necessary in order to gain the same DC output voltage. In the case that the current exactly designated by this command flows the actual circuit causes damage. The limitation means 1145 is provided for avoiding this, which can be implemented by setting the limitation value at a value where circuit damage is not caused.

On the contrary, in the case when the power voltage rises suddenly the DC output voltage also rises. In the case that this value exceeds a predetermined value, it can be implemented by turning off the switching element. This can be implemented by giving a forced turning off command to the comparison means 34 from the judgment means 1141 in FIG. 11.

Figure 15:
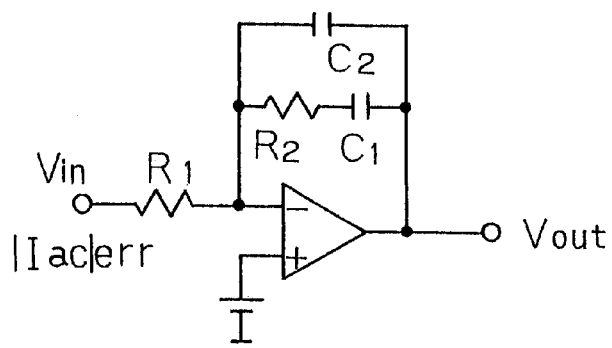
FIG. 15 is a circuit diagram of a compensating filter of the current control system according to a prior art.
Figure 16:
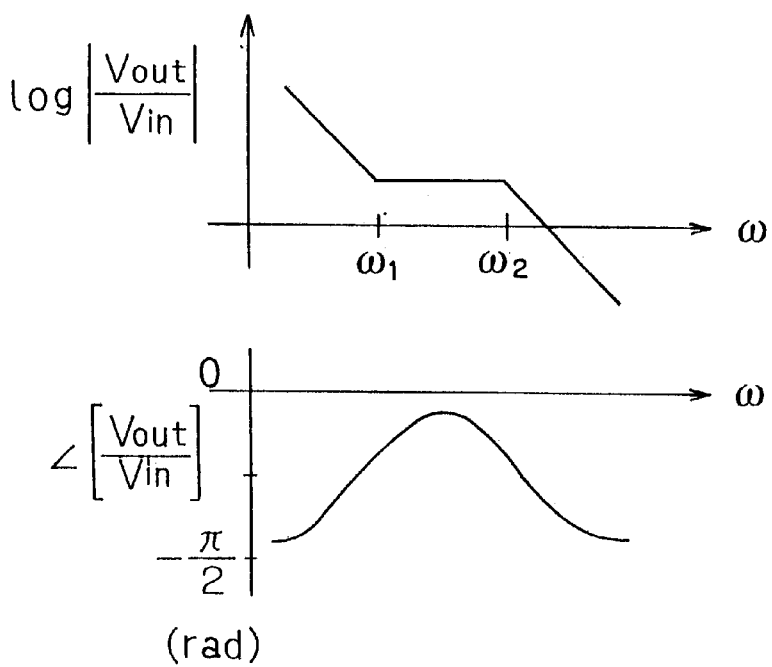
FIG. 16 is a frequency characteristic diagram of a compensating filter of the current control system according to a prior art.

Next, the operation of the compensating filter 1133 of the current control system in FIG. 11 is described. The current control system shows a response of an integration system where the current increases from the present condition when the on-duty of the pulse width modulation is increased. For such as a control system a compensating element using an analog operational circuit has a configuration as shown in FIG. 15. In FIG. 15 an operational amplifier is used, and a resistance R2 together with a capacitor C1 connected in serial, and a capacitor C2 are connected to the feedback loop in parallel. And a resistance R1 is inserted in the input part. FIG. 16 shows a frequency characteristics of the circuit in FIG. 15. As shown in FIG. 16 the amplitude characteristics are increased in the gain at low frequency, are flat in the middle range and attenuate at high frequency as seen in the above diagram. Here $\omega 1 = 1/(C1 \cdot R2)$ and $\omega 2 = 1/(C2 \cdot R1)$. On the other hand, the phase characteristics are delayed 90 degrees in the low frequencies, approach to zero in the middle range and again become delayed 90 degrees in the high frequencies as seen in the lower diagram. Accordingly, in order to secure the stability the loop gain of the control system in the section where the phase delay is the smallest may be set at 1. Increasing the gain in the low frequency range has the effect of improving the constant characteristics of the control system because lowering the gain in the high frequency range has the effect of preventing malfunction due to noise or the like. In a control circuit, operating according to a time unit, such as a microcomputer as described so far, however, it is difficult to stabilize the operation by such a compensating filter. Because, in the case of the operation according to a time unit, operation time is required until the control operation result is outputted for the detected information, and the detected information, or the operation result, are not used as the newest information until the next time unit.

Figure 13:
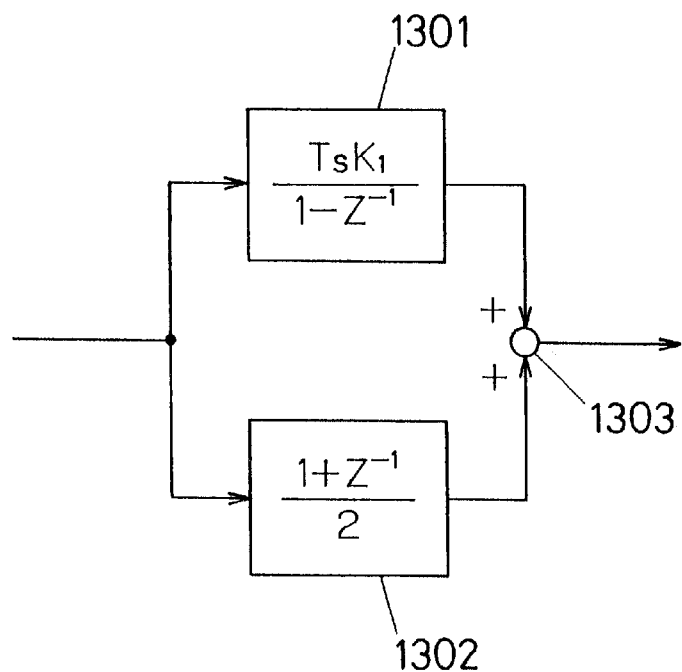
FIG. 13 is a processing block diagram showing compensating filter processing of the current control system in the second embodiment.
Figure 14:
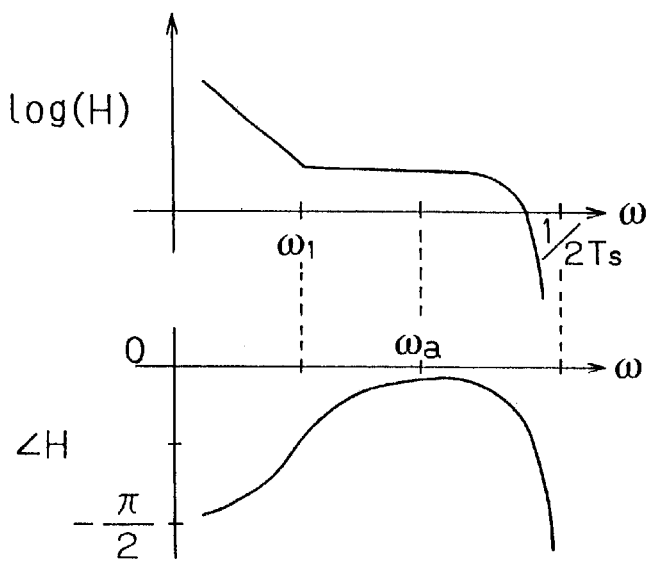
FIG. 14 is a frequency characteristic diagram of the above FIG. 13.

FIGS. 13 and 14 show a proper compensating filter in such a case and its characteristics. FIG. 13 shows an implementation of the compensating filter according to a z-conversion representation. The block 1301 is an integration processing operation of the time constant Ki and the block 1302 is a moving averaging filter processing operation. The results of those two processing operations are added in the addition means 1303 to complete the compensating filter operation processing. FIG. 14 shows a frequency characteristic of the processing result of FIG. 13. The upper stage shows amplitude characteristics of the transfer characteristics and the lower stage shows the phase characteristics. The amplitude characteristics increase at a lower frequency than $\omega 1 = 1/Ki$ and attenuate remarkably when approaching to the frequency which is half of the unit frequency (1/Ts) (Nyquist frequency). The phase characteristics delay by 90 degrees at low frequency, recover the delay in the middle range and start delaying dramatically when approaching to the Nyquist frequency. Accordingly, in the case that the loop gain is set at 1 in the frequency ($\omega a$) where the phase is most recovered, full stability can be secured. Those frequency characteristics at $\omega$ a have a smaller phase delay than the frequency characteristics in FIG. 16, which can prevent stability interference due to the operational time delay or the like. Here, the compensating filter processing shown in FIG. 13 can, of course, be implemented easily by software of a microcomputer.

Figure 17:
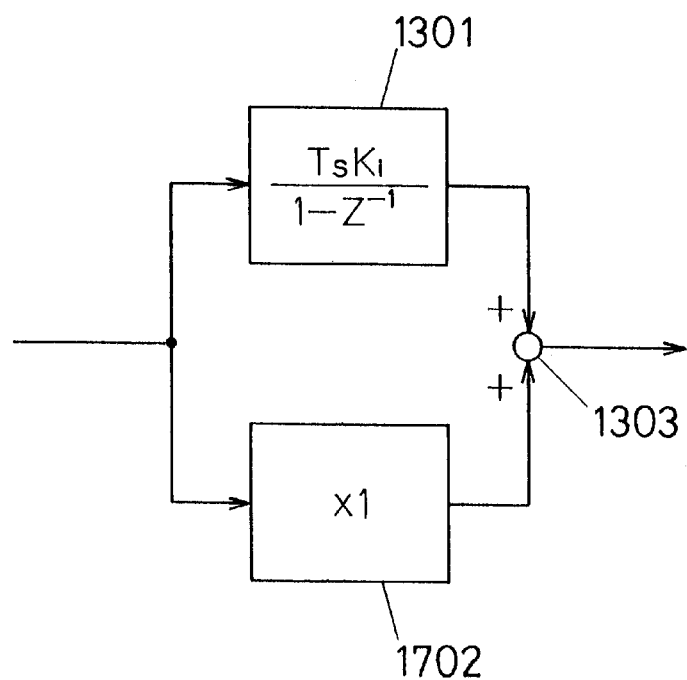
FIG. 17 is a processing block diagram showing another configuration example of compensating filter processing of the current control system in the above second embodiment.
Figure 18:
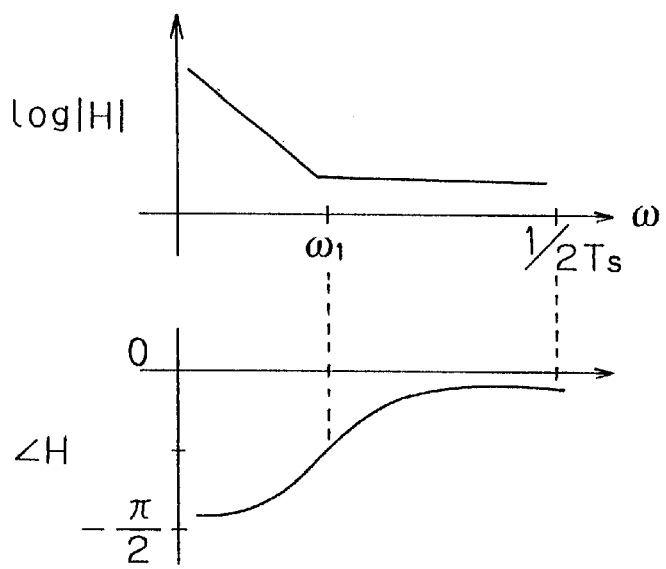
FIG. 18 is a frequency characteristic diagram of the above FIG. 17.

FIGS. 17 and 18 show simplified configuration examples of FIGS. 13 and 14. FIG. 17 shows an implementation of the compensating filter according to z-conversion in the same way as FIG. 13. The block 1301 and the addition means 1303 are the same as in FIG. 13. In FIG. 17, the block 1702 is replaced with the moving averaging filter processing 1302 in FIG. 13. The processing of the block 1702 is the same as doing nothing, which shows the skipping of the moving averaging processing. Accordingly, the operational processing is simplified. FIG. 18 shows frequency characteristics of the processing result of FIG. 17, of which the upper stage shows amplitude characteristics of the transfer characteristics and of which the lower stage shows the phase characteristics of the transfer characteristics. Both the amplitude characteristics and the phase characteristics are the same as the characteristics in FIG. 14 in the frequency range lower than $\omega 1$. Without the moving averaging processing there is no decrease in the amplitude characteristics and there is no increase in the phase delay at the Nyquist frequency. Based on the presupposition that the processing is carried out for every time unit, the system as a whole has the characteristics where the amplitude characteristics are greatly decreased in the vicinity of the Nyquist frequency, therefore, the mole function due to noise or the like can be fully avoided. On the contrary, the method in FIG. 13 further improves the antinoise characteristics or the like.

Next, the operation content of the feed forward element 1140 in FIG. 11 is described. In the feed forward operation element 1140, the following operation is carried out by using the DC voltage set value Vdc*, the input current command |Iac|*, the input voltage |Vac| and reactor value L:

$$dff = (Vdc^* - |Vac|)/Vdc^* + L \cdot (|Iac|^* - |Iac|^* old)/Vdc^*$$

Wherein "|Iac|*old" is a current command value one unit measurement before. The first term in this equation is a duty calculating formula of the booster converter and the second term is a duty calculating formula which is necessary for the current variation. Accordingly, by carrying out this operation a duty can be predicted which is necessary for the input current wave form control so that the load for improving the characteristics by feed back can be lightened.

The input voltage |Vac| is an assumed wave form in the first embodiment of the present invention and the variation of the power supply voltage or unevenness of the parts also exist, therefore, it is possible to practically use the value gained by multiplying a value smaller than 1 to the calculated value of the above described "dff."

As a method to simplify the calculation of those prediction values it is also possible to use "Dff" according to the following equation:

$$dff' = (Vdc^* - |Vac|)/Vdc^*$$

As a method having the same effect, it is also possible to use the actual DC voltage Vdc instead of the above described DC voltage set value Vdc* or the actual input current value |Iac| instead of the input current command |Iac|*.

As described above, according to the first and the second embodiments of the present invention the effects are gained as described below:

(1) The configuration of a part for detecting the input voltage information can become compact and can easily identify the power frequency.

(2) The input voltage information can be detected with low loss.

(3) The operation can be stabilized against the variation of the input power supply.

(4) Standard time for the pulse width modulation output and the time unit of the control processing can be the same so that the configuration of the control circuit becomes simple.

(5) The influence of noise to the input voltage information detection circuit can be canceled.

(6) The DC output voltage can be implemented so that the main circuit loss becomes minimum.

(7) The noise due to switching can be reduced.

(8) A current transformer which needs no circuit power supply can be utilized so that the detection circuit loss can be reduced.

(9) The integration operation can be implemented to eliminate the constant deviation of the output voltage.

(10) At the time when the input power supply voltage is lowered the over current condition can be avoided to increase reliability.

(11) At the time when the input power supply voltage is raised, the over voltage condition can be avoided to increase reliability.

(12) The influence of the operational time delay or the like can be avoided to improve the power factor.

(13) The prediction duty can be found from the input voltage and the set value so that the load of the feed back control can be reduced to improve the power factor.

Figure 22:
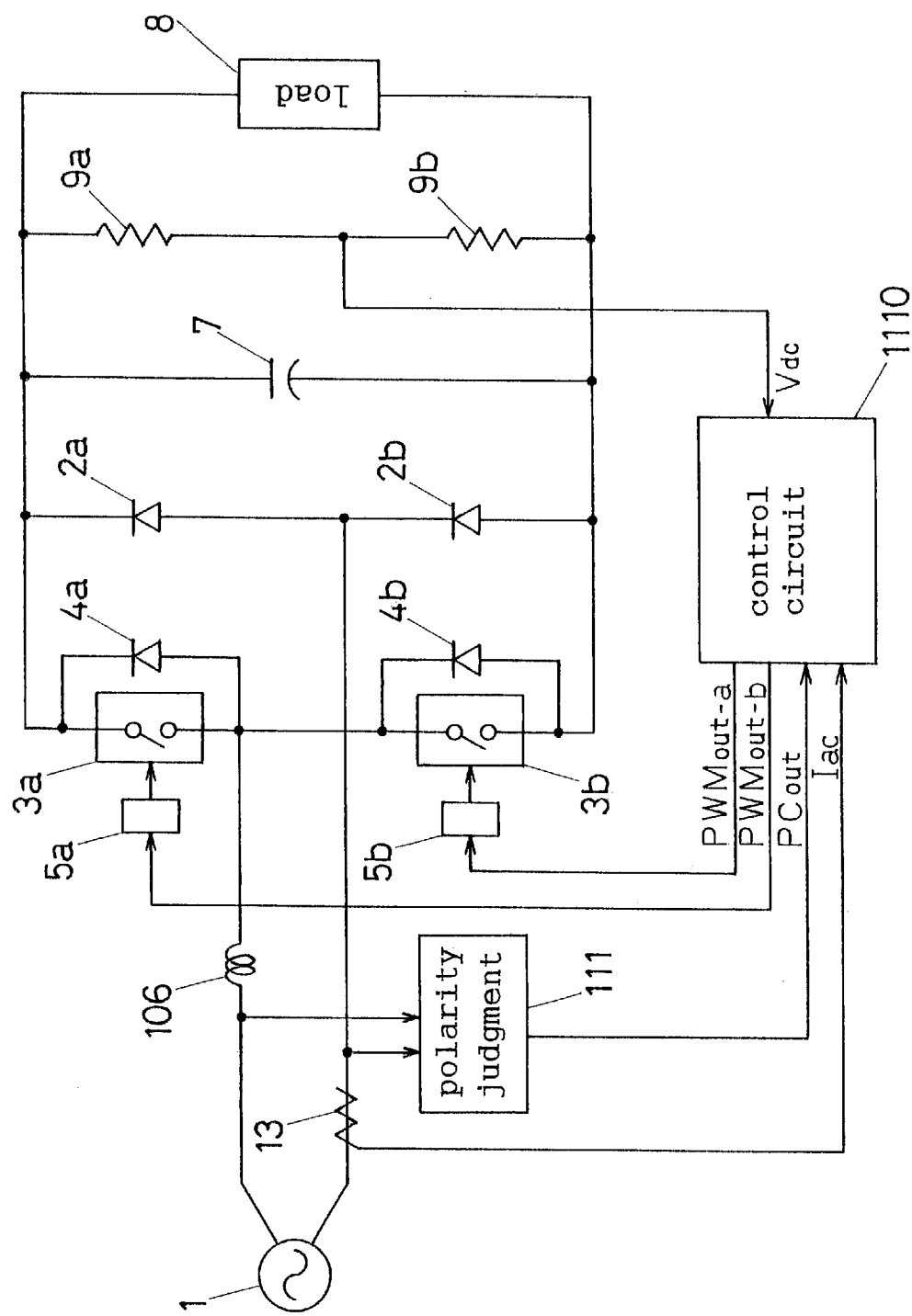
FIG. 22 is a configuration diagram showing a converter circuit of the third embodiment according to the present invention.

Though, in the above described embodiments the main circuit configuration is described as in the configuration in FIG. 1 (same as FIG. 20) or FIG. 19, switching elements 3a and 3b as well as high speed diodes 4a and 4b are provided to one arm and rectifier diodes 2a and 2b are provided to the other arm so that the lower side switching element 3b is PWM-controlled, when the voltage on the side of the reactor 106 is higher and, on the contrary, the upper side switching element 3a is PWM-controlled, when the voltage on the side of the reactor 106 is lower based on the polarity of the polarity judgment means 111, by the control circuit 1110 as shown in FIG. 22 in order to implement the same operation.

Though in the above described embodiments the voltage polarity detection means uses the photocoupler in the configuration, the embodiment is not limited to this and other methods may be used as far as the polarity of the voltage can be detected.

EFFECT OF THE INVENTION

As is clear from the above description, the present invention provides a circuit which has the advantages that the number of elements through which the main circuit current passes is reduced, circuit loss is reduced and increased efficiency is aimed at and which implements miniaturization, loss reduction and noise reduction of the detection circuit with a simple configuration which can gain a high power factor.

What is claimed is:

1. A converter circuit comprising:
a reactor connected to an AC power supply;
a PWM converter circuit connected to the reactor, said PWM converter circuit having a high speed diode, a rectifier diode and a switching element connected in parallel to the rectifier diode;
an input current detection means for detecting an input current of said PWM converter circuit;
a DC voltage detection means for detecting an output voltage of said PWM converter circuit;
a voltage level detection means connected to said AC power supply, said detection means detecting whether or not an input voltage is at a constant level; and
a control means for measuring a variation period of a detection result of the voltage level detection means to judge a power supply frequency and for controlling said PWM converter circuit based on a judgment result for the power supply frequency, a detection result from said voltage level detection means, an input current detected by said input current detection means, and an output voltage detected by said DC voltage detection means.

2. A converter circuit according to claim 1 wherein said voltage level detection means has a photocoupler connected to said AC power supply, and wherein the detection result of said level detection means is a voltage on a secondary side of said photocoupler.

3. A converter circuit according to claim 1 wherein said control means has a sine-wave generation means for generating a sine-wave based on the detection result of said voltage level detection means and said control means consecutively measures a variation period Tac of the detection result of said voltage level detection means, a rise time Ton of the detection result of said voltage level detection means and a fall time Toff of the detection result of said voltage level detection means so as to set times of (2·Ton+2·Toff+Tac)/4 and (2·Ton+2·Toff+3·Tac)/4 as a zero cross time of the AC power supply voltage for starting generation of the sine-wave.

4. A converter circuit according to claim 3 wherein said control means predicts a next Ton and Toff using said Tac and, in a case where Ton or Toff is not detected, a prediction result as the next Ton and Toff predicted by the control means is used and in a case where Ton or Toff is detected, the prediction result is modified by utilizing the detected value obtained based on where Ton or Toff is detected.

5. A converter circuit according to claim 3 or 4 wherein consecutive measurement and operation of a variation period Tac of the detection result of said voltage polarity detection means, a rise time of the detection result of said voltage polarity detection means and a fall time Toff of the detection result of said voltage polarity detection means are carried out for each PWM control period of said PWM converter circuit.

6. A converter circuit according to claim 3, wherein, in the case of carrying out consecutive measurement and operation of a rise time Ton of the detection result of said voltage polarity detection means and a fall time Toff of the detection result of said voltage polarity detection means, the same condition is confirmed for n times continuously for each PWM control period of said PWM converter circuit to perform the calculation by advancing a time corresponding to (n−1) times of said PWM control periods while carrying out said operation processing.

7. A converter circuit according to claim 3 wherein said control means PWM-controls said PWM converter circuit by utilizing said sine-wave as a standard wave form of the input current wave form, but multiplying an error between a predetermined output DC voltage set value and said detecting output voltage with the amplitude of said sine-wave so as to use the result as a set value of the input current wave form, and by utilizing an error between the set value of the input current wave form and the input current detected by said input current detection means and, in addition, adjusts a set value of the DC output voltage so that a PWM control duty of said PWM converter circuit is in a constant range.

8. A converter circuit according to claim 3 wherein:
said input current detection means has a current transformer using a lead from said AC power supply as a primary side; and said control means uses a value gained by letting a secondary side output of said current transformer pass through a frequency characteristic correction means and an absolute value conversion means as a detection input current (|Iac|), and uses a multiplication result between an absolute value of an input voltage wave form or an absolute value of said sine-wave and a value based on an error of said output voltage as an input current set value (|Iac|*).

9. A boost-type converter circuit comprising a reactor connectible to an AC power supply and a control means for charging current in said reactor by short circuiting a converter output with a switching element and for outputting current charged in said reactor through a diode by turning off said switching element, said control means being provided, with respect to an error between an output DC voltage and its set value, with an integration operational function of the error and a proportion operational function of the error so that said control means sums outputs of said two operational functions and utilizes the resulting sum to determine an amplitude of an input current set value, and wherein when the error exceeds a certain value, said control means fixes the output of said integration operational function to a present value by forcing said switching element to turn off.

10. A boost-type converter circuit comprising a reactor connectible to an AC power supply and a control means for charging current in said reactor by short circuiting a converter output with a switching element and for outputting current charged in said reactor through a diode by turning off said switching element, said control means being provided, with respect to an error between an output DC voltage and its set value, with an integration operational function of the error and a proportion operational function of the error so that said control means utilizes a multiplication result between a sum of outputs of said two operational functions and an absolute value of a voltage wave form of said AC power supply to determine an input current set value, and wherein when the input current set value based on the error exceeds a certain value, said control means uses a predetermined value for limitation.

11. A boost-type converter circuit comprising a reactor connectible to an AC power supply and a control means for charging current in said reactor by short circuiting a converter output with a switching element and for outputting current charged in said reactor through a diode by turning off said switching element, said control means being provided, with respect to an error between an output DC voltage and its set value, with an integration operational function of the error and a proportion operational function of the error so that said control means utilizes a multiplication result between a sum of outputs of said two operational functions and an absolute value of a voltage wave form of said AC power supply to determine an input current set value, and said control means detects an absolute value of input current to gain an error between the absolute value and the input current set value for performing one of a proportional integration-type characteristics operation having an integral characteristic at low frequency with respect to the error between the absolute value and the input current set value, and a proportional integration type characteristics operation having an integral characteristic at a low frequency and having a flat characteristic at a high frequency, so as to gain on- and off-duties of said switching element.

12. A boost-type converter circuit comprising a reactor connectible to an AC power supply and a control means for charging current in said reactor by short circuiting a converter output with a switching element and for outputting current charged in said reactor through a diode by turning off said switching element, said control means being provided, with respect to an error between an output DC voltage and its set value, with an integration operational function of the error and a proportion operational function of the error so that said control means utilizes a multiplication result between a sum of outputs of said two operational functions and an absolute value of a voltage wave form of said AC power supply to determine an input current set value, and said control means detects an absolute value of input current to gain an error between the absolute value and the input current set value for performing one of a proportional integration-type characteristics operation having an integral characteristic at low frequency with respect to the error between the absolute value and the input current set value, and a proportional integration type characteristics operation having integral characteristics at low frequency and having a moving averaging characteristic at high frequency, so as to gain on- and off-duties of said switching element.

13. A converter circuit according to claim 12 wherein said control means adds an operational result performed for said error with a value dff calculated out, for an absolute value |Vac| of the input voltage, an input current absolute value command |Iac|*, an output DC voltage set value Vdc*, an inductance L of said reactor and an input current absolute value command |Iac|* old at a time of a previous operation, according to the following equation, so as to gain on-and off-duties of said switching element:

$$dff=(Vdc*-|Vac|)/Vdc*+L\cdot(|Iac|*-|Iac|*old)/Vdc*.$$

14. A converter circuit according to claim 12 wherein said control means adds an operational result performed for said error with a value which is gained by multiplying a value smaller than 1 with a value dff calculated out, for an absolute value |Vac| of the input voltage, an input current absolute value command |Iac|*, an output DC voltage set value Vdc*, an inductance L of said reactor and an input current absolute value command |Iac|* old at a time of a previous operation, according to the following equation so as to gain on- and off-duties of said switching element:

$$dff=(Vdc*-|Vac|)/Vdc*+L\cdot(|Iac|*-|Iac|*old)/Vdc*.$$

15. A converter circuit according to claim 12 wherein said control means adds an operational result performed for said error with a value which is gained by multiplying 1 or a value smaller than 1 with a value dff calculated out, for an absolute value |Vac| of the input voltage and an output DC voltage set value Vdc*, according to the following equation, so as to gain on- and off-duties of said switching element:

$$dff=(Vdc*-|Vac|)/Vdc*.$$

16. A converter circuit according to any one of claims 13 to 15 wherein said control means uses an output voltage value Vdc instead of said output DC voltage set value Vdc* and/or uses actual input current value |Iac| and |Iac| old instead of the input current absolute value command |Iac|* and |Iac|* old.

17. A converter circuit according to claim 4 wherein, in the case of carrying out consecutive measurement and operation of a rise time Ton of the detection result of said voltage polarity detection means and a fall time Toff of the detection result of said voltage polarity detection means, the same condition is confirmed for n times continuously for each PWM control period of said PWM converter circuit to perform the calculation by advancing a time corresponding to (n−1) times of said PWM control periods while carrying out said operation processing.

18. A converter circuit according to claim 5 wherein, in the case of carrying out consecutive measurement and operation of a rise time Ton of the detection result of said voltage polarity detection means and a fall time Toff of the detection result of said voltage polarity detection means, the same condition is confirmed for n times continuously for each PWM control period of said PWM converter circuit to perform the calculation by advancing a time corresponding to (n−1) times of said PWM control periods while carrying out said operation processing.

* * * * *